Nov. 3, 1970              T. HORVATH              3,537,779

CARTRIDGES AND RELATED MECHANISMS

Filed Aug. 24, 1967              13 Sheets-Sheet 1

INVENTOR

Tibor Horvath

BY Polachek & Saulsbury

ATTORNEYS

Nov. 3, 1970 T. HORVATH 3,537,779
CARTRIDGES AND RELATED MECHANISMS
Filed Aug. 24, 1967 13 Sheets-Sheet 2

INVENTOR
Tibor Horvath
BY
Polachek & Saulsbury
ATTORNEYS

Nov. 3, 1970　　　　　T. HORVATH　　　　3,537,779
CARTRIDGES AND RELATED MECHANISMS
Filed Aug. 24, 1967　　　　　　　　　　　13 Sheets-Sheet 3

INVENTOR
Tibor Horvath
BY
Polachek & Saulsbury
ATTORNEYS

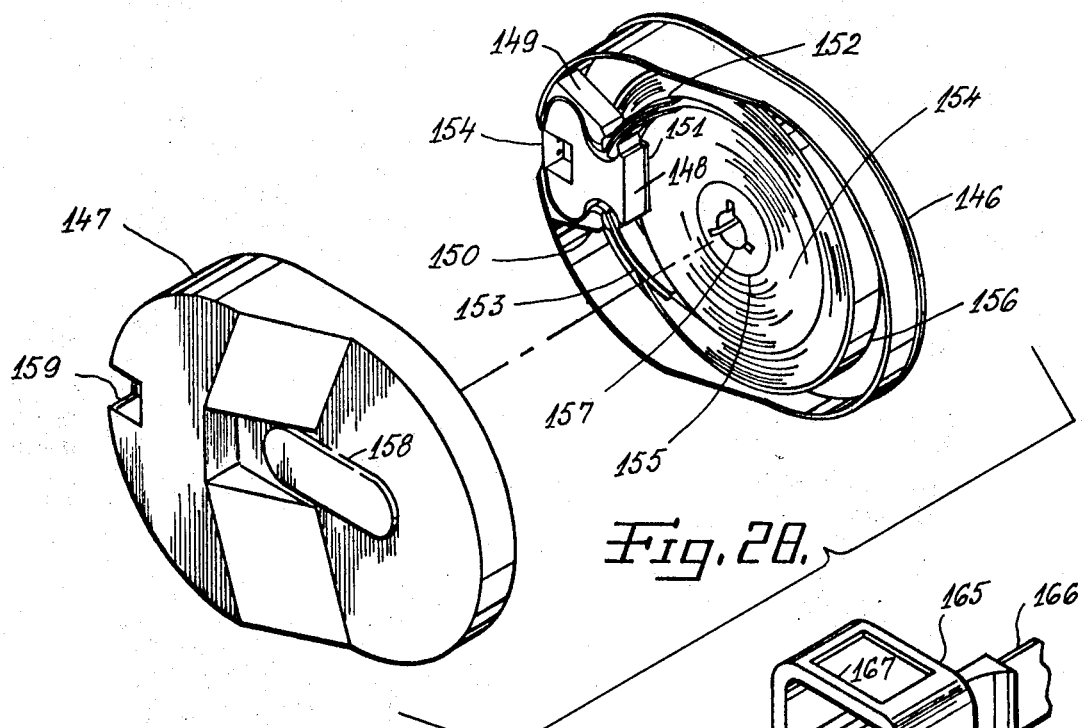
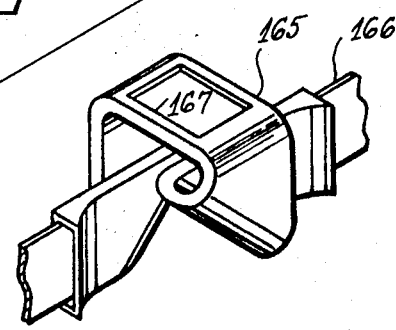
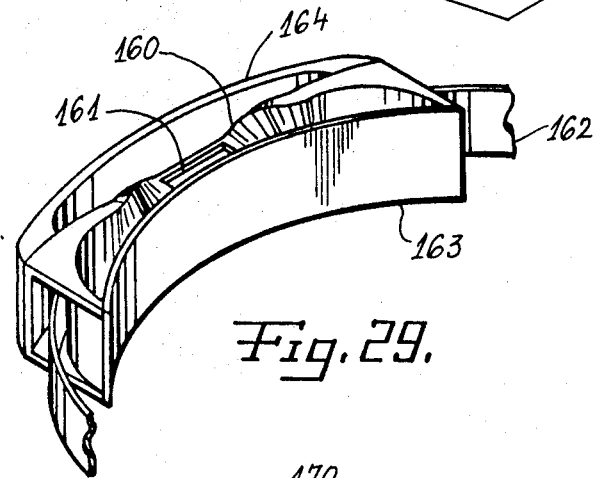
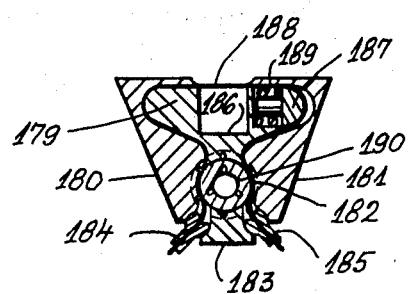
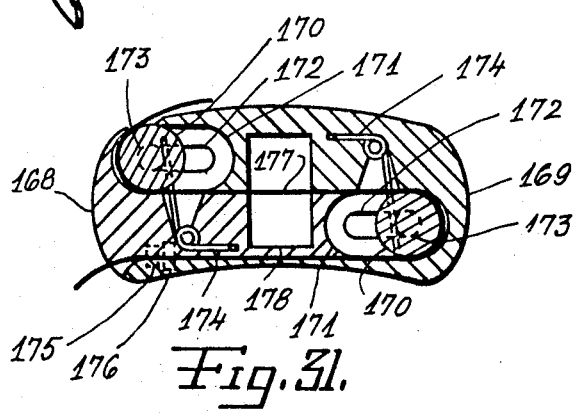

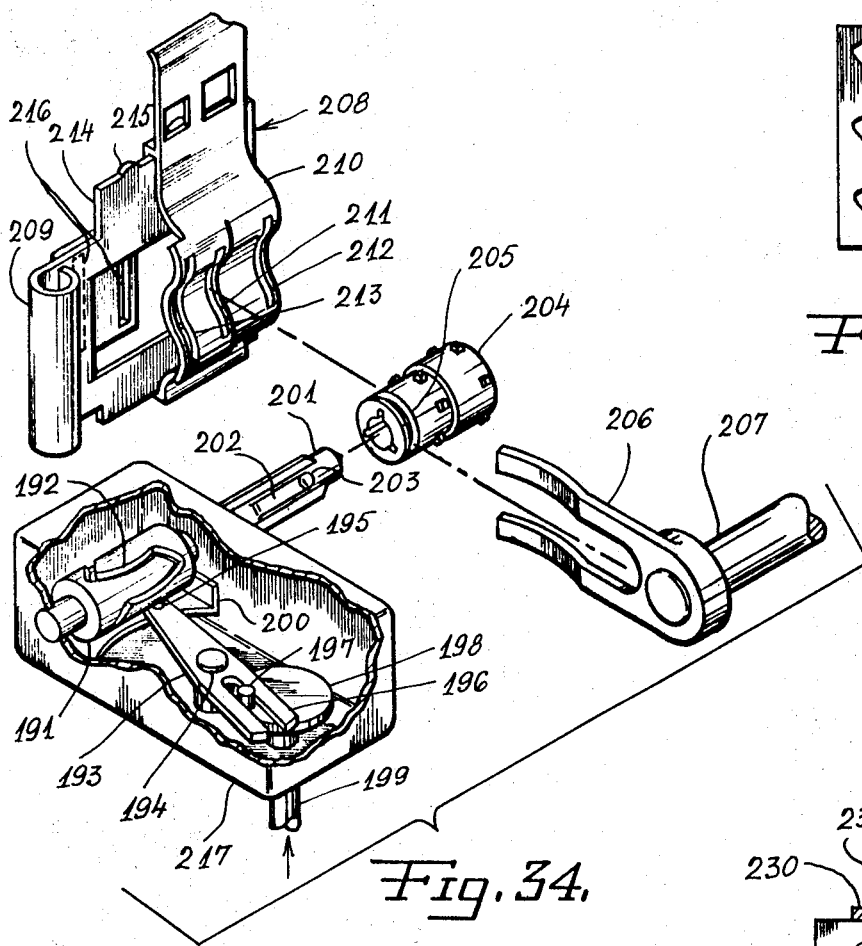

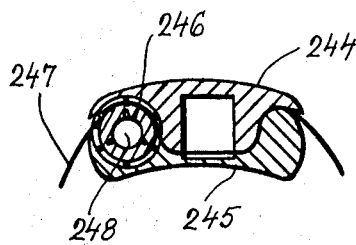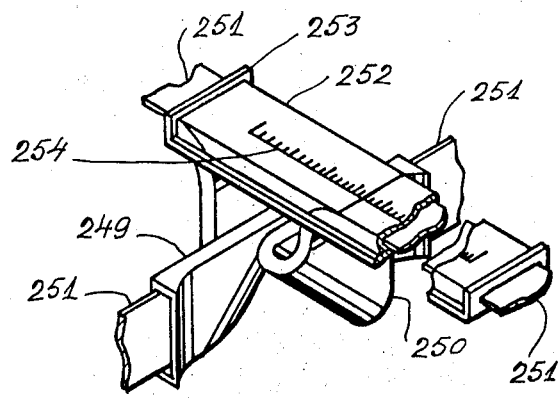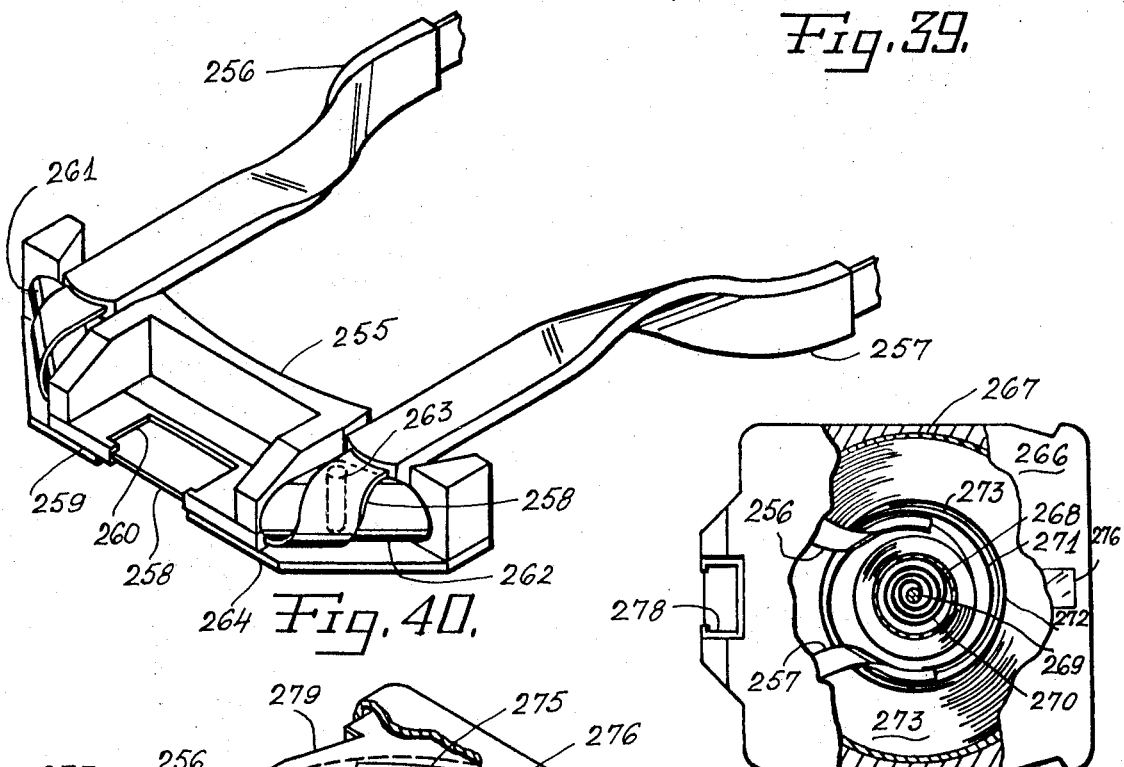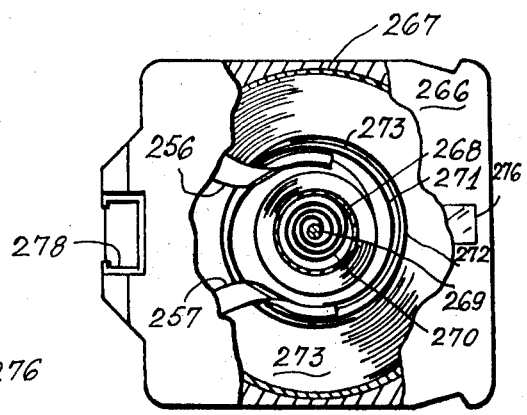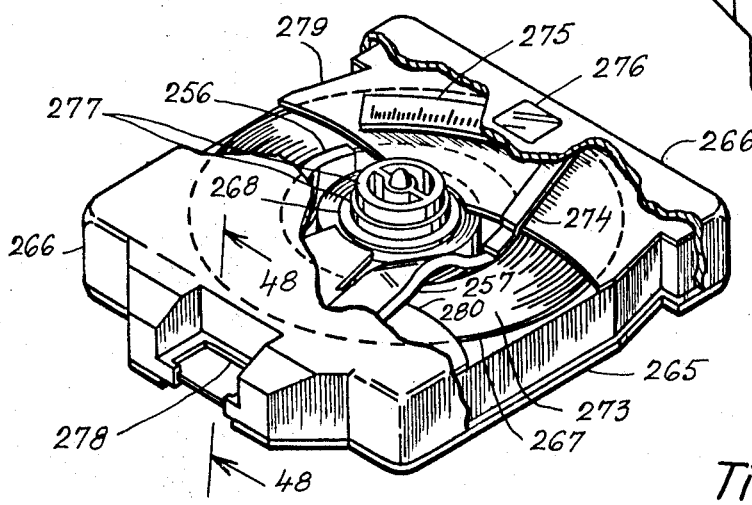

Nov. 3, 1970 — T. HORVATH — 3,537,779
CARTRIDGES AND RELATED MECHANISMS
Filed Aug. 24, 1967 — 13 Sheets-Sheet 9

INVENTOR
Tibor Horvath
BY Polachek & Saulsbury
ATTORNEYS

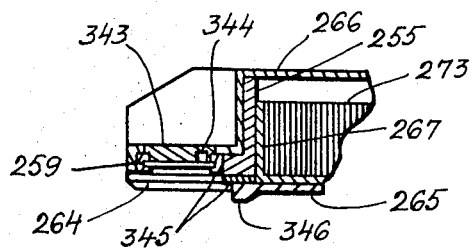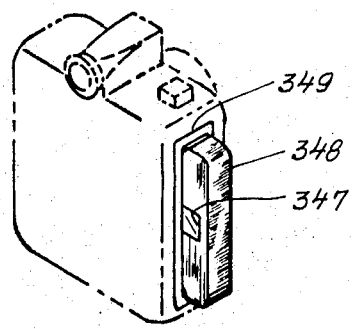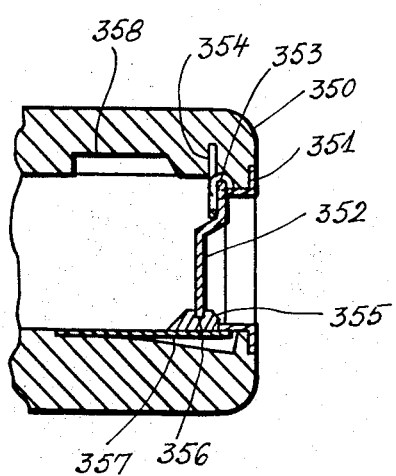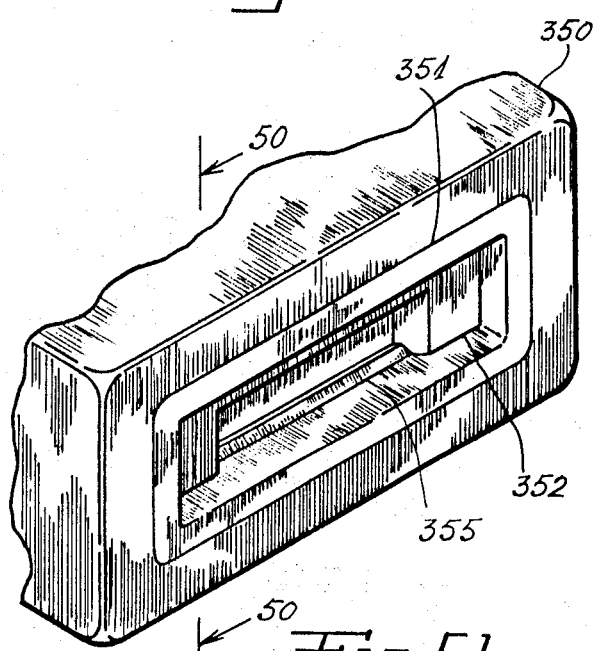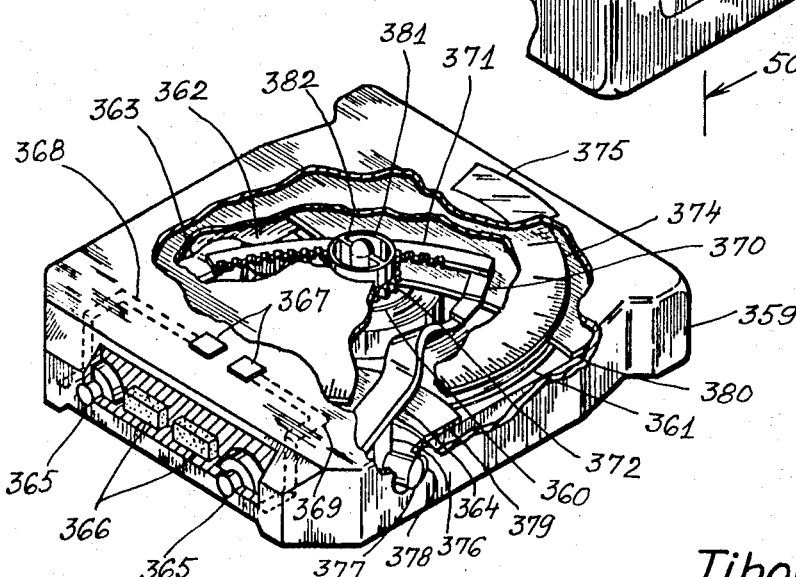

Nov. 3, 1970 T. HORVATH 3,537,779
CARTRIDGES AND RELATED MECHANISMS
Filed Aug. 24, 1967 13 Sheets-Sheet 12

INVENTOR
Tibor Horvath
BY Polachek & Saulsbury
ATTORNEYS

Nov. 3, 1970 T. HORVATH 3,537,779
CARTRIDGES AND RELATED MECHANISMS
Filed Aug. 24, 1967 13 Sheets-Sheet 13

INVENTOR
Tibor Horvath
BY
Polachek & Saulsbury
ATTORNEYS

United States Patent Office 3,537,779
Patented Nov. 3, 1970

3,537,779
CARTRIDGES AND RELATED MECHANISMS
Tibor Horvath, 944 Avenue R,
Brooklyn, N.Y. 11223
Filed Aug. 24, 1967, Ser. No. 663,056
Int. Cl. G03b 23/02
U.S. Cl. 352—78　　　　　　　　　　　　9 Claims

ABSTRACT OF THE DISCLOSURE

Cartridge apparatus for motion picture and recording systems including related mechanism, such as components for driving the cartridges, where the cartridge apparatus includes a pair of spools or reels, a supply reel and a take-up reel, one reel in close proximity with the other. In one embodiment of the invention, the reels are coplanar having parallel movable axes, slidable laterally relative to each other, as the film or tape is being transferred from the supply reel to the take-up reel. In another embodiment of the invention, the reels are also coplanar but have coaxial stationary axes. The tape is directed through a guiding structure which has either an optical or a magnetic-type of exposure assembly. In the first embodiment of the invention, the reels are superimposed, one within the other, in the same housing with the guiding structure and exposure assembly located within the housing interweaved within the film or tape between the take-up reel and the supply reel for producing a generally compacted unit, taking up substantially the same space of a single reel in the housing or cartridge. In the second embodiment of the invention, the reels are coplanar having coaxial stationary axes and also superimposed, one within the other in the same housing with the guiding structure and exposure assembly located on the periphery of the reels adjacent the housing.

---

This invention relates generally to a cartridge and related mechanism for driving the cartridge and more particularly to a motion picture and recording cartridge apparatus of the type having a pair of spools or reels, one being the supply reel and the other being the take-up reel which are disposed, one within the other, in a coplanar relationship within the cartridge.

Heretofore, cartridges for motion picture and recording systems are generally loaded with strips of film or tape material prior to being exposed. The strip material in such cartridges are coiled on a cylinder or core within a supply chamber with its leading end guided past an exposure aperture in the case of a motion picture film or past a magnetic head in the case of a recorder and then directed to a take-up cylinder or core within a take-up chamber, related to the supply chamber.

It is desirable to design the cartridge to have minimum outside dimensions. To do this it becomes desirable to reduce the length of the path which the strip material travels within the housing when it is transferred from the supply reel to the take-up reel. However, when the length of the path of the strip material is reduced, there is a tendency for the tape to buckle or jam within the film cartridge and thereby bind against the walls of the passage ways thru which it travels. This will cause unsteady registration of the film at the exposure aperture or erratic operation of the film within the cartridge.

Various methods have been proposed for improvement of the cartridge apparatus. The cartridges have been designed to correct or eliminate this problem but it has been found that defects still occur in cartridge operation causing either a temporary malfunction of the cartridge mechanism which causes stickiness of the free movement of the film or by a defect in the film itself. These methods do not overcome the objection that may result in a break through between perforations by the film advancing claw in the case of a moving picture film or ultimately causing a complete halt of operation within the cartridge.

In addition these deficiencies generally produce a misleading as to the unexposed film or unused tape which is left in the supply cartridge.

Therefore, one object of this invention is to provide an indicator within the cartridge which directly registers the amount of strip material on the supply reel.

Another object of this invention is to provide a cartridge apparatus having means for insuring, from the first to the last picture frame, protection against exposure of the film before insertion and removal of the cartridge from the camera.

Another object of this invention is to provide a cartridge apparatus for cinematographic purposes which will be used in projectors which would permit the film to be easily installed and removed from said cartridge.

Still another object of this invention is to provide an automatic actuation mechanism to rewind or shut off the mechanism at any desired section of the film.

An additional object of this invention is to provide a construction of a camera and projector system operable with the cartridges described in this invention.

Another object of this invention is to provide a film cartridge for use with both cameras and projectors.

Another object of this invention is to provide a silent film advancing mechanism.

Still another object of this invention is to provide a film cartridge for cinemographic apparatus with improved film guiding, film tensioning and film controlling elements for movement of the film from a supply reel to a take-up reel wherein said reels are located in the same chamber and are coaxial and coplanar to each other.

A further object of this invention is to provide for a mechanism for a motion picture or recording system which automatically operates either a supply or take-up reel depending on the direction of the rotation of said mechanism wherein the reels are concentrically disposed within each other.

Still another object of the invention is to provide an entrance in the camera which readily is opened and closed with the insertion and removal of a cartridge, thereby preventing the erroneous insertion of said cartridge.

A further object of this invention is to provide a fully automatic mechanism for recording purposes designed in conjunction with the above referred corresponding cartridges.

Still a further object of this invention is to provide a film cartridge with an uninterrupted operation of twice the amount of the film or tape as a presently used film or tape cartridge with generally the same outside dimensions of the cartridges.

For further comprehension of the invention and of the objects and advantages thereof, reference will be had to the following description and accompanying drawings and to the appended claims in which the various novel features of the invention are more particularly set forth.

FIG. 28 is an exploded isometric view of a cartridge in accordance with another embodiment of the invention;

FIG. 29 is an isometric view of a guide exposure assembly;

FIG. 30 is an isometric view of another guide exposure assembly;

FIG. 31 is an orthographic view of still another guide and exposure assembly, wherein the assemblies of FIGS. 29–31 are used in a cartridge as illustrated in FIGS. 1 to 19;

FIG. 32 is a sectional view of another guide and exposure assembly, which may be used in a cartridge of FIG. 28;

FIG. 33 is an extended surface view of a cam cylinder used in a mechanism shown in FIG. 34;

FIG. 34 is an exploded isometric view of an apparatus featuring a film advancing mechanism with sliding sprockets and a picture frame bracket;

FIG. 35 is a plan view of an extended surface of another cam cylinder, as that shown in FIG. 33, coupled with an operative mechanism;

FIG. 36 is an extended cam surface view of a cam cylinder in accordance with another embodiment of the invention in cooperation with its corresponding mechanism;

FIG. 37 is an end view of a cam cylinder in accordance with still another modification of this invention with its immediate operating mechanism, wherein the cylinders of FIGS. 35 to 37 can be substituted for the cylinder of FIG. 33;

FIG. 38 is a sectional view of a guide and exposure assembly using the film advancing sprocket applicable for eliminating the problem of using a conventional film advancing claw in the operation of the cartridges illustrated in FIGS. 1–19;

FIG. 39 is an isometric view of part of a guide and exposure assembly directing the film from its coiled position of a supply reel into an exposure aperture and back into a coiled position onto a take-up reel, said two reels concentrically located within each other;

FIG. 40 is an isometric view of another guide and exposure assembly with pivoting guiding arms;

FIG. 41 is a plan view of a loaded film cartridge using the guide and exposure assembly illustrated in FIG. 40, with parts broken away to show a spring installation coupling supply and take-up reel, with another spring installation separating the supply coil from the take-up coil;

FIG. 42 is an isometric view of the cartridge of FIG. 41 illustrating a quantity indicator and the central core construction;

FIG. 48 is a fragmentary sectional view of the film cartridge of FIGS. 41–42, of said view taken at the guide and exposure assembly of said cartridge taken on line 48—48 of FIG. 42;

FIG. 49 is an isometric view illustrating the film cartridge of FIGS. 41–42 being mounted in a camera;

FIG. 50 is a fragmentary sectional view showing an entrance of a film cartridge within the camera of FIG. 49 taken on line 50—50 of FIG. 51.

FIG. 51 is an isometric view of the entrance of FIG 50;

FIG. 52 is an isometric view of a cartridge similar to that of FIGS. 41–42 but modified for supporting a recording tape;

Figure 58:
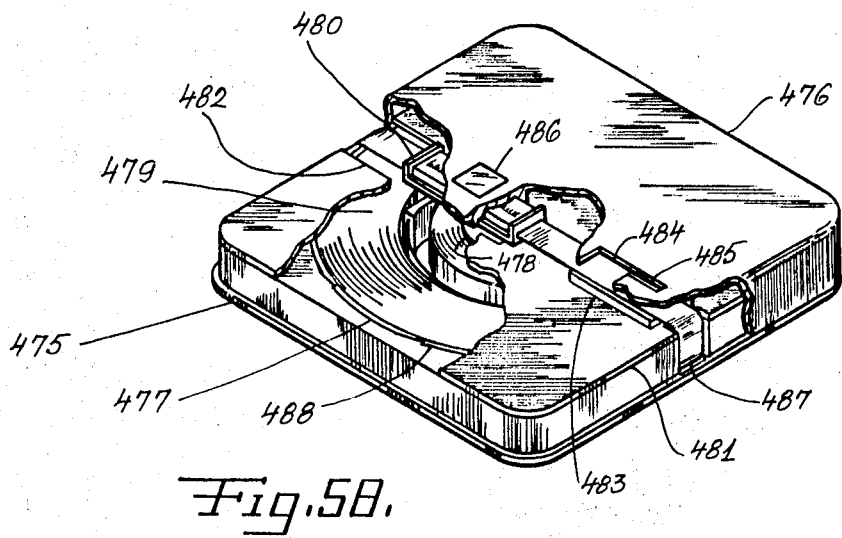
Figure 59:
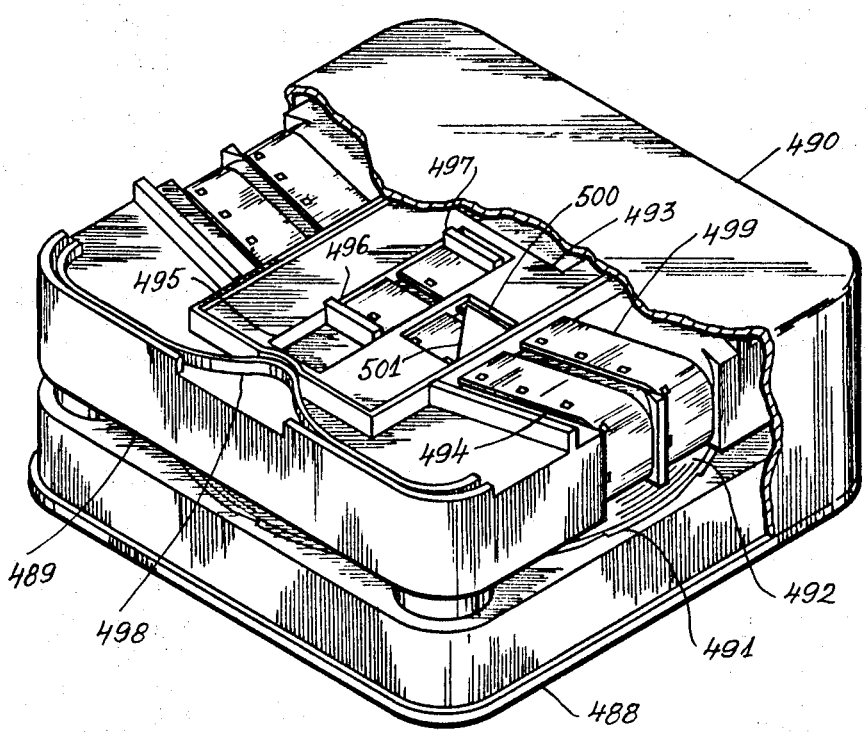

FIG. 58 is an isometric view of a movie film cartridge illustrating still another embodiment of the invention in which is employed the guiding mechanism of FIG. 39 with parts broken away to show the supply reel and the take-up reel with the exposure aperture assembly therebetween; and FIG. 59 has an isometrical view of a pair of cartridges, as in FIG. 58, but of a modified form mounted face-to-face, with the guiding mechanism being disposed wither side by side or diametrically opposite to each other, parts have been broken away to show the exposure aperture plate holding the leading ends of the films from both cartridges so that when the film reaches its end the plate will snap into correct exposure position with the other film.

Generally, this invention provides for a cartridge apparatus having a pair of coplanar reels, one reel disposed within the other, and related mechanisms for the operation of the reels within the cartridge apparatus. One reel of the pair of reels is a supply reel and the other reel is a take-up reel. The reels being disposed within each other in such a manner as to permit a stationary sensor such as an exposure assembly interweaved within a strip of film or being transferred from the supply reel to the take-up reel. The reels having parallel axes which are movable relative to each other and being variably eccentric during its transfer operation.

Therefore, in the first embodiment of the invention which is shown primarily in FIGS. 1 to 27, 29 to 31 and 38, the cartridge apparatus generally comprises a supply reel, a take-up reel and a guiding means and exposure assembly. The reels, are hereinbefore described, are coplanar supported in a cartridge disposed within each other in a manner that the axes of the two reels are parallel and are slidable towards and away from each other in a plane perpendicularly to the axes of the two reels, with the guide and exposure assembly being stationary between the two reels. The other embodiment of the invention, as primarily illustrated in FIGS. 33 to 37 and 39 to 59 includes a supply reel, a take-up reel and guiding means and exposure assembly wherein the reels are coplanar and have concentric stationary axes and being disposed within each other. The cartridge apparatus of this embodiment includes a guide system which is usually part of the exposure assembly which in this case is located outside of and adjacent to the reels. The guide system slides between the reels within the coils and in a plane perpendicular to the coaxial axes of the two reels.

In addition FIGS. 28 and 32 illustrate a combination of the two cartridge apparatus in accordance with a further embodiment.

Figure 1:
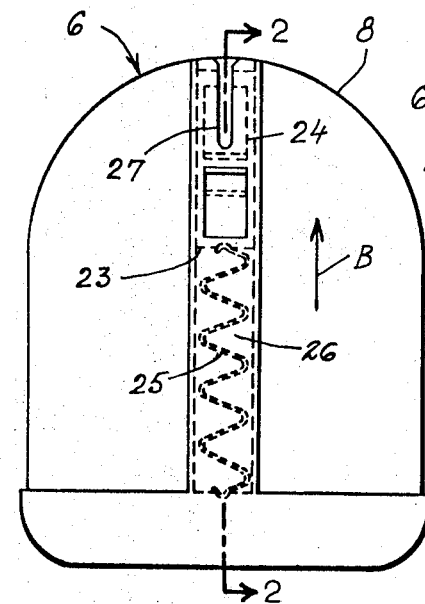
FIG. 1 is a front elevational view of a loaded cartridge in accordance with a preferred embodiment of this invention.
Figure 2:
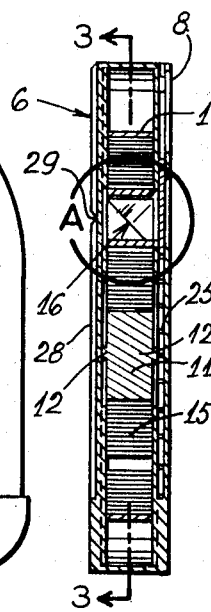
FIG. 2 is a sectional view of the cartridge taken substantially on line 2—2 of FIG. 1.
Figure 3:
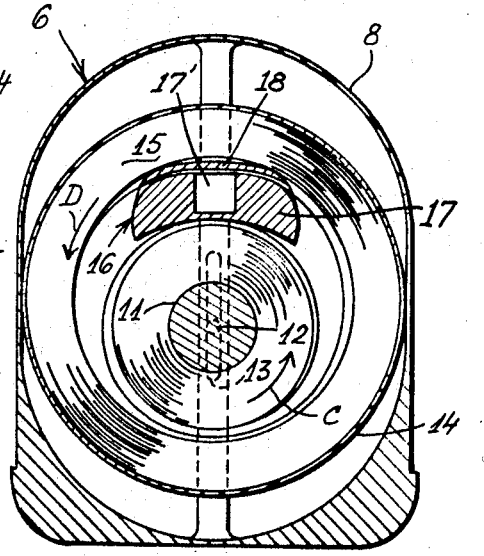
FIG. 3 is a sectional view of the cartridge wherein the reel is in the middle of its transfer process of operation, taken on line 3—3 of FIG. 2.
Figure 4:
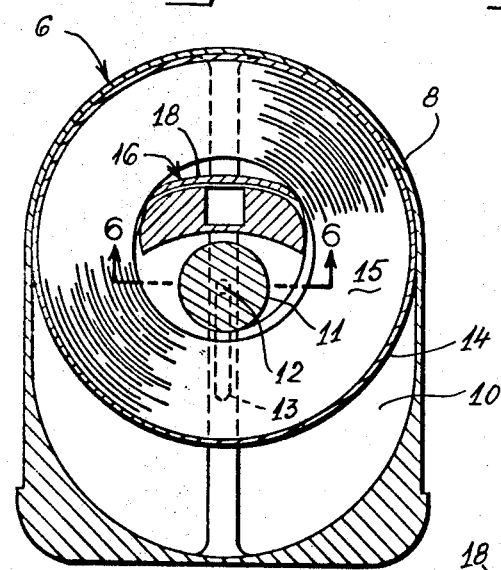
FIG. 4 is a sectional view of the cartridge illustrating one extreme position of the film or tape after it has been subjected to exposure, taken on line 3—3 of FIG. 3.
Figure 5:
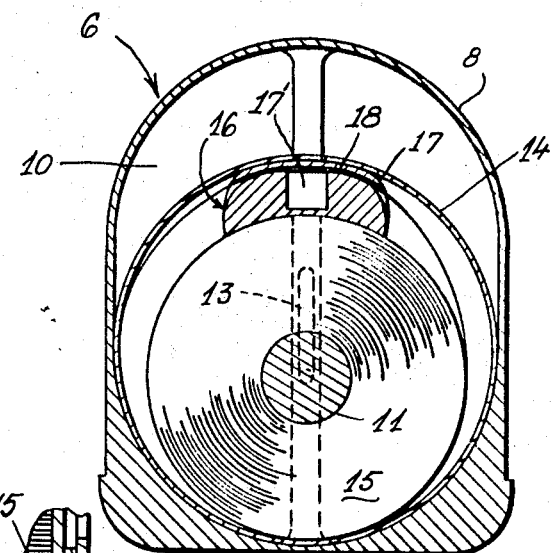
FIG. 5 is a sectional view of the cartridge shown in FIGS. 3 and 4 illustrating another extreme position of the film or tape before it has been subjected to exposure, taken on line 3—3 of FIG. 2.
Figure 6:
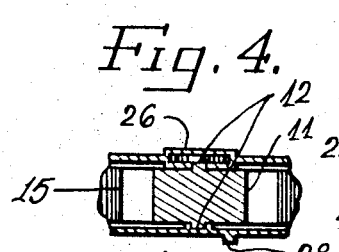
FIG. 6 is a sectional view taken on line 6—6 of FIG. 4.

Referring particularly to FIGS. 1 to 7, and keeping in mind that the elements shown in the other figures of the drawing are cooperative herewith, there is shown a cartridge apparatus 6 with a U-shaped body 8 having an oval-shaped chamber 10 mounting a supply reel core 11 having opposed studs 12 supported within slots 13 of the U-shaped body 8. A take-up reel cylinder 14 is used for receiving a roll of tape or film 15, from the supply reel core 11. Therefore, as best shown in FIGS. 3, 4, and 5, the supply reel core 11 supports a supply reel and the take-up reel cylinder 14 supports a take-up reel, both made up from the roll film 15.

Figure 7:
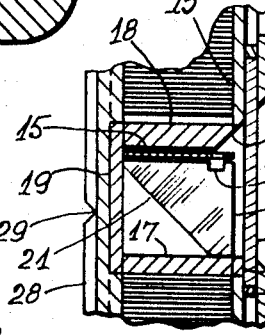
FIG. 7 is an enlarged detail view of a guiding means and exposure assembly taken at area A of FIG. 2.
Figure 8:
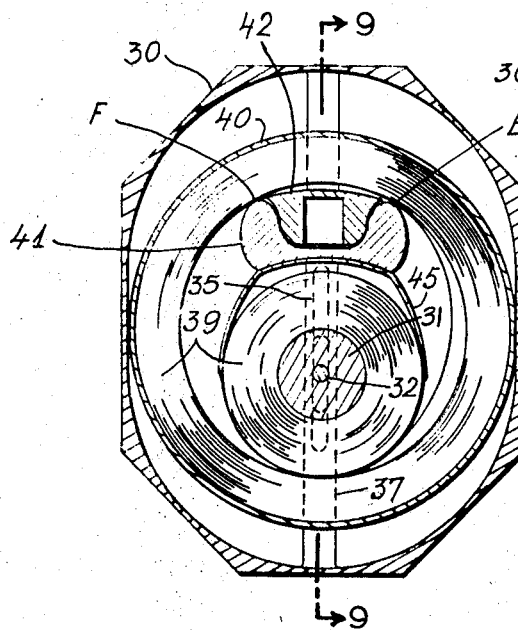
FIG. 8 is a sectional view of a cartridge in accordance with another embodiment of the invention, wherein the reel is in the middle of its transfer operation, taken on line 8—8 of FIG. 9.
Figure 13:
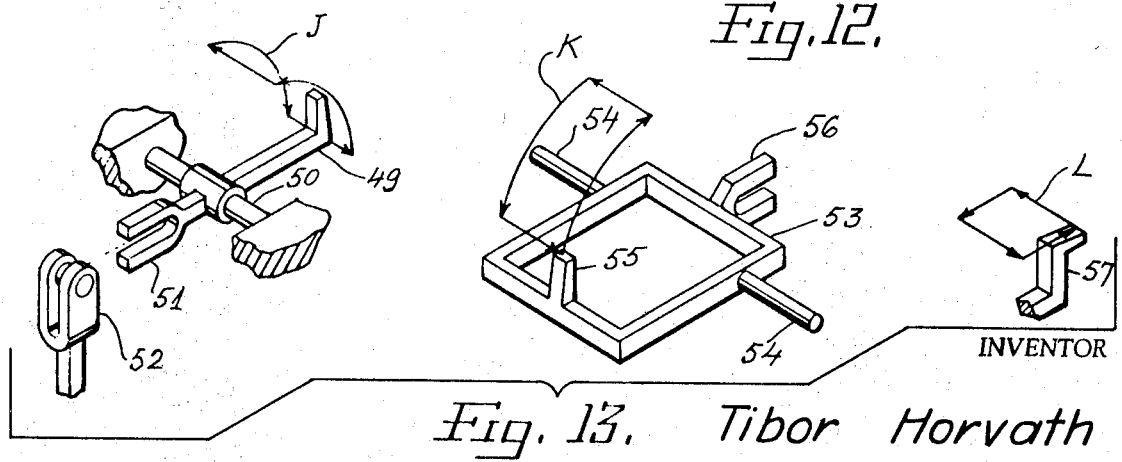
FIG. 13 are isometric illustrations of a series of film advancing claws operable with the cartridges shown in FIGS. 1 to 12, and driven by a conventional film advancing mechanism.

A guide and exposure assembly 16 which includes four parts, as best shown in FIG. 7, includes a block 17 supplied with an aperture 17' for permitting exposure to the film 15. In addition, the exposure assembly 16 includes a back-up shield 18 having an angle cut at 45°, at one end A to make room for a film advancing claw as shown in FIG. 13. The movement of the roll of tape or film 15 within the exposure assembly 16 is provided by the claw shown in FIG. 13 and as hereinafter more fully described. In forming the complete guide and exposure assembly 16 there is provided a pair of plates 19 and 20 which also have an aperture cooperating with the opening of block 17.

Within the opening of block 17 there is located a prism 21 supplied with a slot 22 to permit the over extension of the moving claw. Covering the prism 21 is a slidable plate 23 having also at one end, an aperture 24 which is somewhat larger than the aperture in the block 17. Keeping the plate 23 in a closed position is a spring 25. Further supporting the plate 23 and the spring 25 is an enclosure 26 which also has an aperture matching the exposure aperture. The enclosure 26 is equipped with a slot 27 so that when the cartridge is inserted into a camera in the direction of arrow B a stud disposed in the camera will slide along the slot 27 pushing plate 23 into position in which aperture 24 is squarely under the prism 21 thereby completely uncovering the exposure aperture. It should be understood that one purpose of this apparatus is to provide a complete light tight protection to the cartridge from the first picture frame, starting from the supply reel to the last picture frame, leaving the supply reel. A protrusion 28 is formed on the cartridge, having a notch 29, registering the correct position of the cartridge in relation to the camera which has a spring disposed within it for urging an element against the notch 29 for the proper relationship between the cartridge and the camera when the cartridge is installed into the camera. In addition the camera will include a film advancing mechanism which will operate the cartridge to rotate the film 15 in a direction shown by arrows C and D.

Referring to FIGS. 8 to 12, there is shown an octagon-shaped cartridge 30 with an oval-shaped chamber supporting a supply reel core 31 through a supply shaft 32 which is formed at one end so that it can slide within a groove 33 formed in the cartridge 30. The other end of the shaft 32 is mounted on a plate 34 which is also provided with a slot 35 formed in the cartridge for permitting sliding of the supply reel core 31 in the transfer operation. The plate 34 is marked with numbers 0 to 50 in the direction the shaft 34 travels within the groove 33. The numbers 0 to 50 indicate the quantity of film remaining within the cartridge, which can be read through a window 36 which is in turn sealed with a transparent material, colored to prevent exposure of the film within the cartridge. The groove 33 and the slot 35 are formed with enforcements 37 and 38 which serve also for the purpose of guiding the supply reel core 31 which in turn supports the supply reel and a film coil 39 which is transferred from the supply reel onto a take-up reel cylinder 40 which supports the take-up reel. The reinforcements 37 and 38 spaces the film 39 from the cartridge walls and thereby prevents the film from rubbing thereon.

A guide and exposure assembly, comprising blocks 41 and 42, including an upper plate 43 and a lower plate 44. The film passing between the blocks 41 and 42 is protected by the blocks from being exposed to unwanted light. The advancing film 39, within the exposure block assembly, helps the outer roll of film to rotate by rubbing against it at points E and F. In the guide and exposure assembly, the block 41 is supplied with a spring 45 to keep the supply film from springing and to press it against the take-up reel. Thus, each reel helps the other for the rotational operation. The exposure assembly supports a prism 46 which directs the light in a predetermined angle and in addition is used to determine the size and shape of the picture frame. The prism 46 also includes a slot for allowing the over extension of a moving claw, such as that shown in FIG. 13. Plate 44 also includes an aperture 47 cut large enough for permitting the moving claw to operate the film. In addition there are depressed register marks 48 in the bottom of the plate 44 at two sides of the exposure aperture 47. The depressions 48 allow the cartridge to slide into a camera in the direction indicated by arrow G and arrow H and in a direction 90° to that of the arrows G and H. By this method the cartridge is positioned within the camera when the depressions 48 mate with a matching registered mark in the camera. It should be noted that since all the hereinbefore elements are on one side of the cartridge, as illustrated in FIGS. 8 to 11, two of these cartridges can be mounted back to back.

Figures 9, 10:
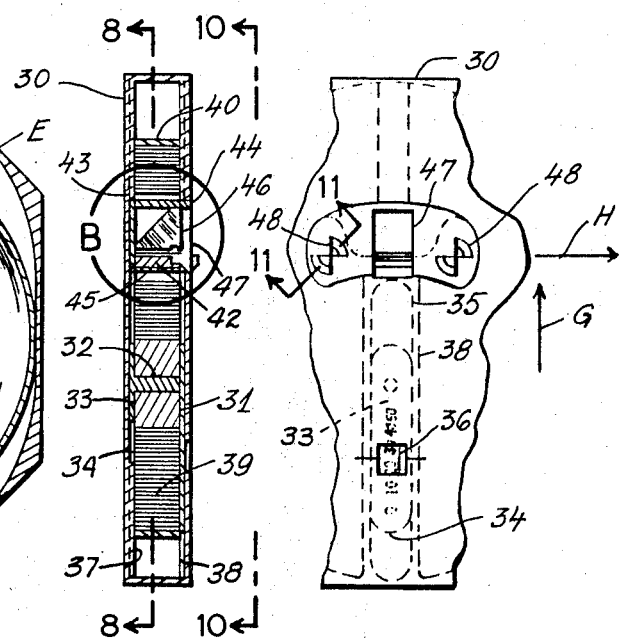
FIG. 9 is a sectional view of the cartridge taken on line 9—9 of FIG. 8.
FIG. 10 is a fragmentary front view of the cartridge taken on line 10—10 of FIG. 9.
Figure 11:
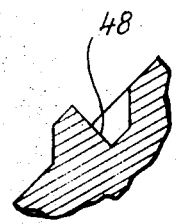
FIG. 11 is a fragmentary sectional view of the cartridge taken on line 11—11 of FIG. 10.
Figure 12:
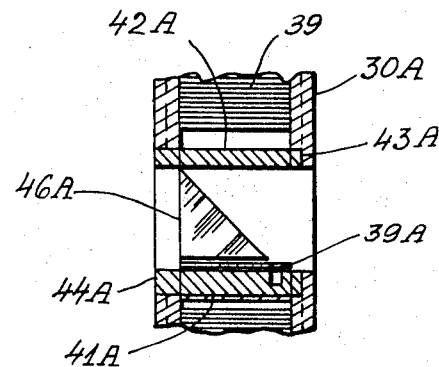
FIG. 12 is an enlarged sectional view of an alternate arrangement of the guiding means and exposure assembly taken at area B of FIG. 9.

FIG. 12 shows a guide and exposure assembly, as that shown in FIGS. 2, 7, and 9 but of a different configuration. The difference between these exposure assemblies is that in the exposure assembly of FIG. 12, the apparatus is open at both sides. Therefore, in the exposure assembly of FIG. 12 a picture image can come from one side and a film advance mechanism can come from the other. This presents a better cooperation of the mechanism because there is no interference with the incoming picture image. More specifically, using the prefix letter A for the corresponding parts, FIG. 12 shows a cartridge 30A of the exposure assembly provided for directing a film 39A therethrough. The guide and exposure assembly includes blocks 41A and 42A with an upper plate 43A and a lower plate 44A. The film 39A passing between the blocks 41A and 42A. In addition the exposure assembly includes other elements, such as a prism 46A having a predetermined angle for the proper operation of the system.

As hereinbefore explained, FIG. 13 shows adapters and one form of an advancing claw which can be used for driving the film 15 of the cartridge shown in FIGS. 1 to 7 or driving the film 39 shown in cartridge of FIGS. 8 to 12. FIG. 13 shows a claw member 49 pivoted on a shaft 50. One end of the claw 49 is supplied with a fork 51 into which a link 52 is engaged. The link 52 is part of a conventional film advancing claw mechanism for operating the claw 49 in a path J while it slides and pivots on the shaft 50. Another form of the claw system for operating the cartridge described in FIGS. 1 to 12 can take the form of a frame 53 which is pivoted about stud shafts 54. One end of the frame 53 has a claw 55 and its opposite end has a fork 56 used in the same manner as the fork 51 of the first claw mechanism shown in FIG. 13. It should be noted that the claw 55 travels in a path K. Claw 55 and its related elements cooperate to provide a picture image projected through a frame without interfering therewith. In addition, it should be noted that when a cartridge is inserted within a camera the claw 55 with its related elements should be in a retracted position for enabling the cartridge to be mounted within said camera. Another claw 57 is shown in the one end of the claw assembly which is in a modified form, to fit into an exposure aperture assembly wherein a side mounting cartridge is provided. The claw 57 travels in a path L in its related mechanism, shown in FIGS. 1 to 13, wherein the supply reel and the take-up reel are coplanar and nested one within the other. A mechanism, well known in the art, actuates the claw shown in FIG. 13 within the perforations of the film for advancing the film from the supply reel through the exposure aperture assembly to the take-up reel. By this process the film is being divided into two coplanar reels having parallel axes moving and being spaced eccentrically within each other, and being directed from one extreme location and within a confined space which is more compacted than the hereinbefore cartridge systems.

It should be understood that the cartridges shown in FIGS. 1 to 12 can be operated by any conventional film advancing claw means which is positioned in a proper operating angle.

Figures 14, 15:
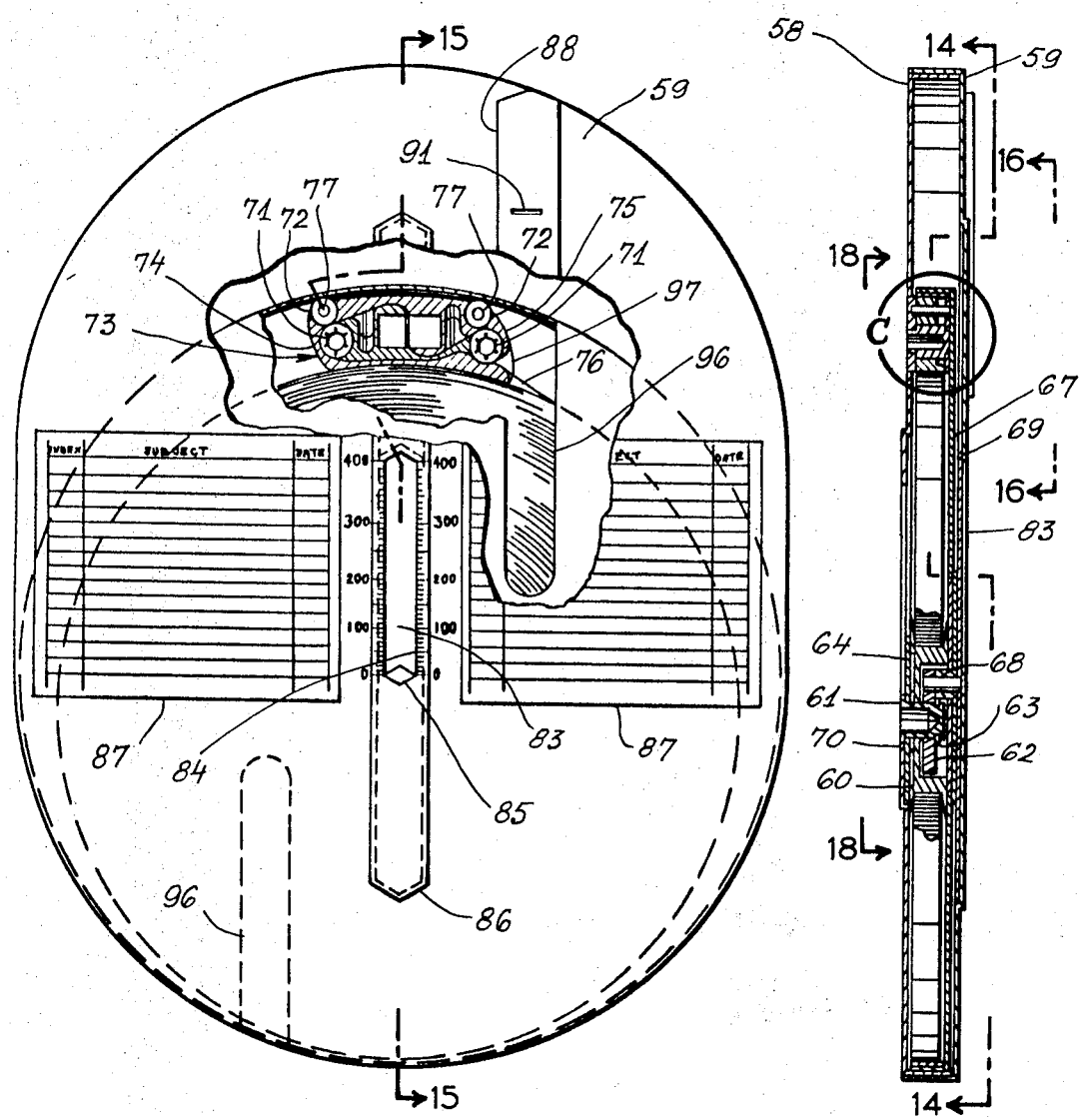
FIG. 14 is a rear elevational view of a loaded cartridge apparatus for projectors, with parts broken away for clarity, showing a guiding means and exposure assembly, taken on line 14—14 of FIG. 15.
FIG. 15 is a sectional view taken along line 15—15 of FIG. 14.
Figure 17:
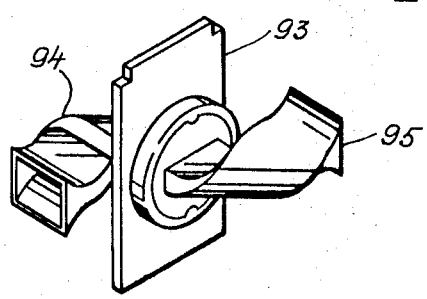
FIG. 17 is an isometric illustration of a mechanism used to install the film in the cartridge apparatus described in this invention.
Figure 18:
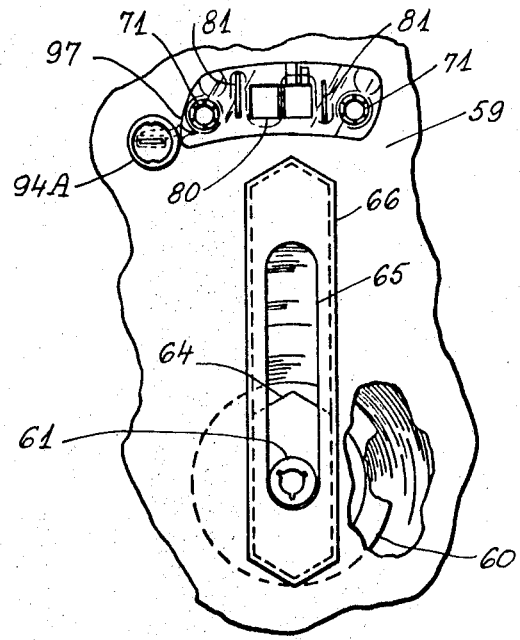
FIG. 18 is a fragmentary front view of the cartridge illustrating the front of the guiding means and exposure assembly and in addition illustrating an alternate version of a film intake, and the supply reel, taken on line 18—18 of FIG. 15.
Figure 19:
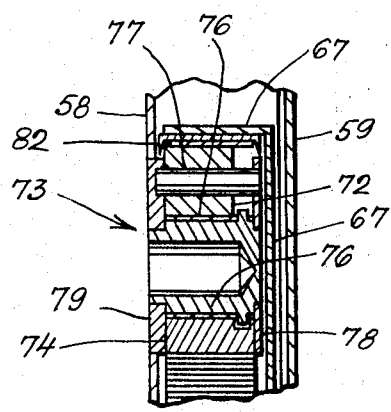
FIG. 19 is an enlarged fragmentary front view of the cartridge taken at area C of FIG. 15.
Figure 25:
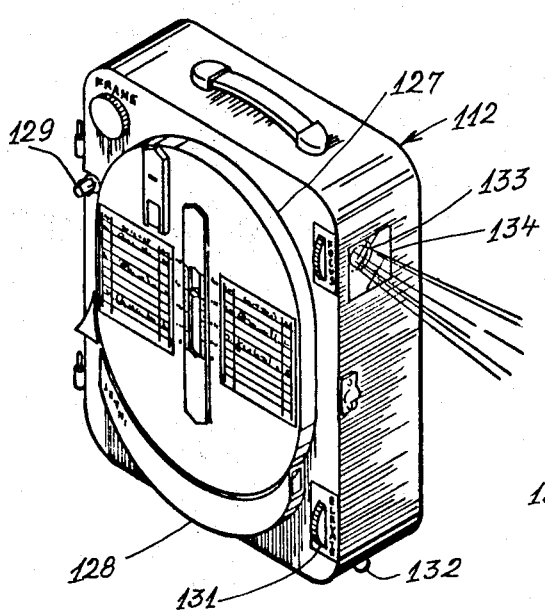
FIG. 25 is an isometric view of a projector supporting a cartridge illustrated in FIGS. 14–19 with an auxiliary guide and exposure assembly as illustrated in FIG. 20.
Figure 26:
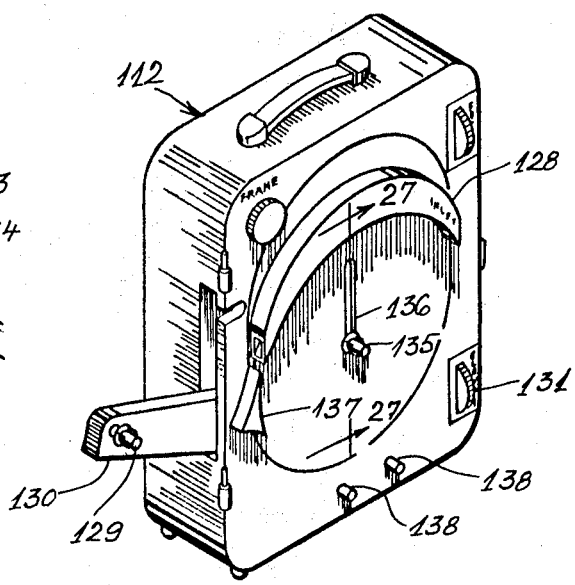
FIG. 26 is an isometric view of projector shown in FIG. 25 as set up for conventional movie projection.

Referring now to FIGS. 14 to 19 there is shown a cartridge apparatus in accordance with another embodiment in this invention. In FIGS. 14 to 19 there is also provided an oval-shaped housing 58 with a matching cover 59 supporting a supply reel core 60 having tapered circumference to retain the film forming thereby the supply reel. The core 60 includes a hollow cylinder 61 having an aperture for matching a stud of a rewind mechanism in a projector, such as shown in FIGS. 25 and 26. The cylinder 61 is supported by a disc 62 and locked into place by retainer ring 63. The other end of the cylinder includes a plate 64 for providing a smooth sliding motion for the cylinder 61 in a slot 65. Housing 58 includes an enclosure 66 permitting plate 64 for movement therein. Disc 62, also supports a take-up reel 67 through a shaft 68. Inside of reel 67 is a friction plate 69 against which the supply reel core 60 is passed by means of a spring washer 70. Since the reels 60 and 67 are eccentrically disposed in relation to each other, the supply reel urges the take-up reel to turn at the upper half faster than the lower half. It should be noted that the proper speed for reel 67 is determined by the speed of sprockets 71 and controlled rollers 72 in an exposure assembly 73. Exposure assembly apparatus 73 comprised, in addition to the above elements, a pair of blocks 74 and 75. The blocks 74 and 75 are constructed to provide an adequate film passage with spaces therebetween for the loops of a film 76. In addition, there is provided a large enough opening for permitting the incoming and the outgoing light beam from the projector. In addition as best shown in FIGS. 14 and 19, the exposure assembly 73 includes two shafts 77 supporting the two rollers 72, with an inner plate 78 and an outer plate 79. The outer plate 79 includes an aperture 80, for the exposure of the film, and a pair of slots 81, permitting adjustment of loops of film whenever it is necessary. FIG. 19 shows that within the inside reel 67 is provided a cylinder 82 with tapered edges that will catch the end of the film. One end of a shaft 68 is supplied with a plate 83 to cover slot 84. Plate 83 includes an indicator 85 and the cartridge cover 59 includes an enclosure 86 for the plate 83. The enclosure 86 is marked along the edges of the slot with numbers from 0 to 400 indicating the amount of film on the take-up reel 67, in feet. It should be noted that the number 400, designates the number of feet of film, and since it is substantially long film, which may include several reels, the cartridge also includes a pair of labels 87 to mark the correct location of each subject reel within the film roll 76.

Since this cartridge may be used for home use, it is provided with means for installing the desired amount of film within the cartridge. Two types of installation for this cartridge is therefore provided as hereinafter more fully described.

Figure 16:
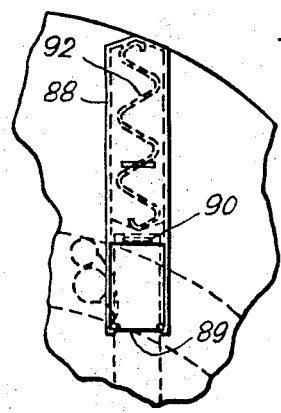
FIG. 16 is a fragmentary rear view of the cartridge illustrating the section where the film is installed or removed, taken on line 16—16 of FIG. 15.

In FIG. 16 there is shown an enclosure 88 supporting a slidable plate 89 which includes a slot 90. Therefore when the plate 89 is guided within the enclosure 88, so that slot 90 is aligned with a slot 91, a coin may be inserted within the two slots which would hold the plate 89 in an open position. When the coin is removed a spring 92 will move the plate 89 back to its closed position.

The installation of a film into the cartridge may take place in two ways. In the first way, the film, may be fed onto the supply reel and in the second way, the film may be fed onto the take-up reel. In both cases a factory installed lead is provided within the guide and exposure assembly extending outwardly from one feeding end. In feeding the film therefore into the cartridge a feeding apparatus, as shown in FIG. 17, can be used. The apparatus of FIG. 17 comprises a plate 93, on which inside channel 94 is rotatably mounted up to 360° and an outside channel 95. The channel 95 can be plugged or unplugged into channel 94 at 180° intervals. In the first way, when feeding the film onto the supply reel, after sliding plate 89 in an open position and held there by a coin, the feeding apparatus shown in FIG. 17 can be installed in a cavity with the inner channel 94 turned toward the supply reel 60. It should be noted that the inner channel and the outer channel will pivot 360° together in a plate 93. When the desired amount of film is fed onto the supply reel the feeding which is provided in the guide and exposure assembly is spliced with the end of the film which has just been installed. In order that the above described process can be utilized, the take-up reel 67 is supplied with at least one slot 96, permitting the film to enter into said slot.

The second way of installing the film when feeding the film into the take-up reel within the cartridge makes it necessary to employ the other side of the cartridge whereby the feeding of the film onto the take-up reel necessitates the use of a groove on a corresponding projector for the installation of the film while the cartridge is mounted on said projector but without the need of slots 96 because the film enters from the other side of the cartridge.

Referring to FIG. 18 of this embodiment, there is shown an inner channel 94A built in the housing 58, the housing 58 is transparent around this area with the outer plate 79 of the exposure assembly 73, so that the position of the film lead inside the cartridge may be observed.

In the installation of film by the second way there is provided in the empty cartridge, the factory installed lead, as in the first case, which extends out of the inner channel 94A which positions the guide and exposure assembly opening 97 under the sprocket as viewed in FIG. 18. After the lead is laced through the outer channel 95 the film to be installed, is spliced on the lead and directed onto the cartridge by either a fast forward or regular projection. After the end of the film disapppears in the slot of the inner channel 94A operation should be stopped and channel 94A should be turned away from the guide and exposure assembly opening 97 leaving the end of the film free. Reversing the operation will result in the supply reel 60 catching the end of the film and ultimately will rewind the roll.

It should be noted that when the film is added to an already filled cartridge, the film in the cartridge should be operated in a forward motion until the end of the film reaches opening 97 in the exposure assembly 73. Then the inner channel 94A should be turned in a position to cover up the opening.

After plugging channel 95 into channel 94A a reversal of the film operation will bring the end of the film out of the cartridge. The film passage in the exposure assembly is designed in such a manner as to synchronize the two sprockets 71 by the film itself. It should be noted that, if in case either end of the film accidentally slips out of the exposure assembly 73 the inner channel 94A may be removed to gain access to said exposure assembly for manually inserting the end of the film into the proper place.

Again it should be noted that if the situation occurs when the whole roll of film is situated on the supply reel 60, with its end coming free from the exposure assembly 73, the end of the film should be inserted back into the opening 97, and by turning the sprocket 73 will pull the film into the passage. In this operation, just before the end of the film returns to the sprockets 71, next to the opening 97, motion of the film should be stopped manually at the exposure window. It should be noted that the other sprocket 71 should continue to push the film until it forms a loop, within a provided chamber, then the end of the film should be permitted to engage the sprocket 71 located at the opening 97, and the other loop chambers should be filled half way by inserting a pin into slot 81 of said loop chamber and pulling half the amount of the film from the other loop chamber. When the whole roll of film is situated in the take-up reel with an end free of the exposure assembly 73 the reinserting process can be reversed.

Figure 20:
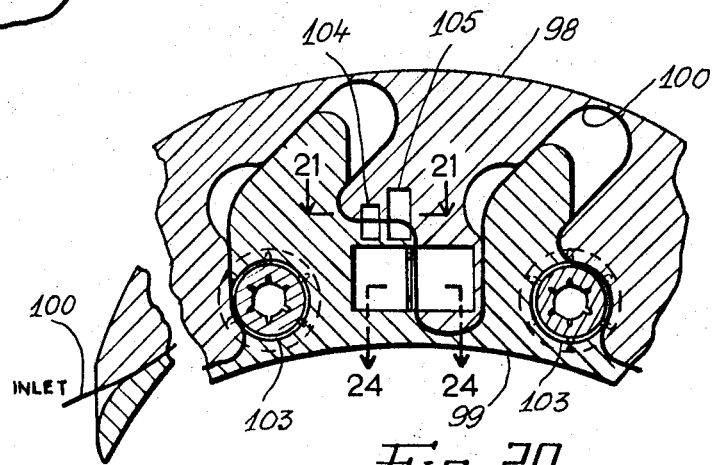
FIG. 20 is an enlarged fragmentary sectional view of an auxiliary guide and exposure assembly which can be used in the case of a supply and take-up reel system, as illustrated in FIG. 26.
Figure 21:
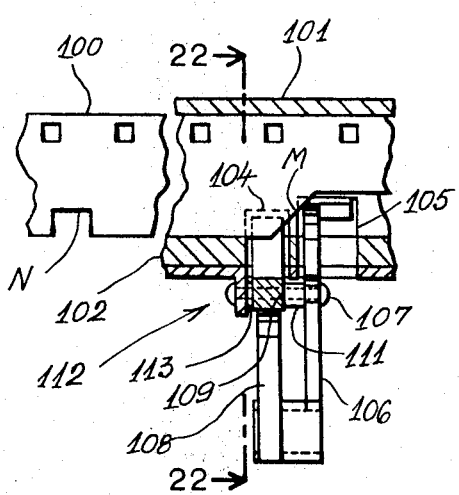
FIG. 21 is a fragmentary sectional view illustrating an actuating mechanism when it is installed on a projector shown in FIG. 26 and used to automatically control a mechanism which stops or rewinds the film or tape at either end of the cartridge, taken along line 21—21 of FIG. 20.
Figure 22:
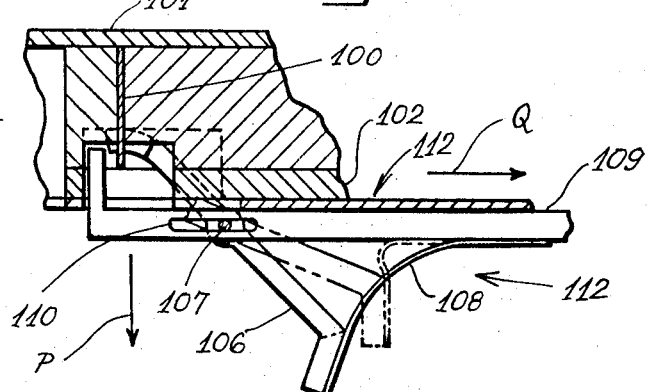
FIG. 22 is another view of the same actuating mechanism of FIG. 21, taken along line 22—22 of FIG. 21.

FIGS. 20–22 show another type of exposure assembly comprised of a pair of blocks 98 and 99. The blocks 98 and 99 are so assembled as to form a film passageway which automatically permits loop formation of film 100 at both sides of the exposure window. Holding the blocks 98 and 99 together are a pair of plates 101 and 102, as best shown in FIGS. 21 and 22. The block 99 supports sprockets 103 for driving the film into the above described passageway between the described blocks. In blocks 98 and 99 are two apertures 104 and 105, to allow room for the automatic film control apparatus extending out of the projector to engage the film.

The openings 104 and 105 also exist on cartridges used with a film control device shown in FIGS. 21 and 22 comprising an arm 106 pivoted at one point by a rivet 107. One end of the arm 106 extends above the surface in which the bottom edge of the film 100 slides. The other end is supplied with a spring 108. The spring 108 has an opposing end mounted on a bar 109 which in turn is connected to a switch or relay for the operation of the switch or relay. As viewed in FIG. 22 the bar 109 includes an L-shaped portion rising above the edge of the film 100. A slot 110 is provided within the bar 109 for support by rivet 107. Between the arm 106 in bar 109 there is a spacer 111 through which the rivet 107 is extended for mounting on the walls of one part of a projector 112. Between the arm and the projector wall there is a washer 113.

Therefore, in order to operate the above described mechanism the film 100 has to be prepared so that the leading end of the film 100 is narrowed and then tapered out into its full width at a 45° angle, as shown at M. After the last picture frame of the transferring film there is provided a rectangular cut made at the end of the film. At the beginning of the transfer operation of the film the arm 106 is moved by the film in the direction, as shown by arrow P. Spring 108 will then force the bar 109 to slide in a direction of arrow Q. The activated position of the arm 106 is indicated in phantom in FIG. 22. In the operation, film 100 will stop the bar 109 at one point. When the film reaches the end of the transfer operation, bar 109 will cross the path of the film through the rectangular cut N to activate a switch or relay system to halt the operation or to activate a rewind mechanism.

Figure 23:
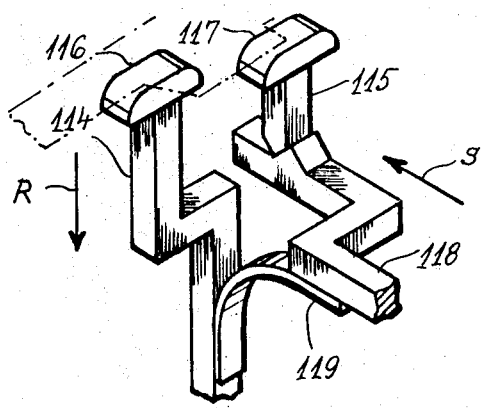
FIG. 23 is an isometric view illustrating an element of another actuating mechanism.

Another type of actuating mechanism is shown in FIG. 23 where there is provided a pair of bars 114 and 115. Bar 114 being longer than the bar 115, and both bars provided with top plates 116 and 117, respectively. Extending substantially perpendicular to bars 114 and 115 is a third bar 118 which is connected to bar 114 by a spring 119. Top plate 117 of bar 115 is situated so that its upper surface is just below the bottom edge of the film herein before described while the top plate of 116 of the bar 114 is extending above the film hereinbefore described. When the bar 114 is forced in a direction of arrow R spring 119 will tend to slide bar 118 in a direction of arrow S, but the film will prevent plate 117 from rising until it reaches the point where a cut-out was prepared within the film as hereinbefore described. At this point when the plate 117 goes through the film the bar 115 will rise permitting bar 118 to follow through for producing a motion activating a rewinding mechanism. When bar 115 drops back it will permit the film to rewind. In addition to the herein described actuating purpose that the apparatus FIG. 23 provides, it can also be used to guide the film through the exposure assembly since both plates 116 and 117 have equal pressure against the film.

Figure 24:
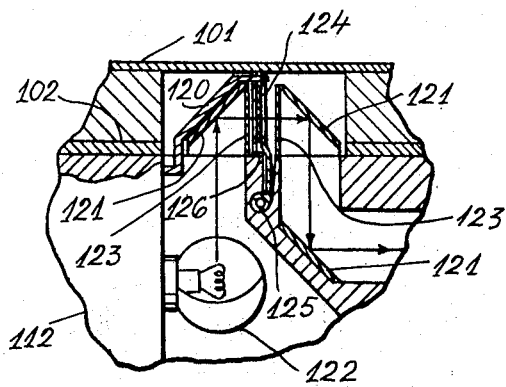
FIG. 24 is a fragmentary sectional view of the cartridge taken along line 24—24 of FIG. 20, combined with a sectional view of a projector illustrated in FIG. 25.

FIG. 24 shows an exposure assembly as described in FIGS. 20–22 having the same cover plate 101 and 102 but using an alternate type of moving claw 120, three mirrors 121 and a light bulb 122 with two transparent shields 123 made of glass for protecting the mirrors 121. In addition there is provided a picture frame bracket 124 pivoted about a pin 125. Furthermore, FIG. 24 shows film protecting bracket 126 generally used in cartridges to prevent accidental rip or tear of the film while the cartridge is being installed in projectors or cameras. The bracket 126 may also be used as a picture frame for use in the overall system of the cartridge apparatus.

FIG. 25 shows that the projector 112, which is specially designed for a cartridge projection mounting includes a side cartridge 127, built similarly to a cartridge of FIGS. 14 to 19. Under the cartridge 127 is an auxiliary exposure assembly 128 similar to that of FIG. 20. A stud 129 is shown for an auxiliary take-up reel which is mounted on an arm 130 as shown in the FIG. 26. It should be noted that when the arm 130 is in a closed position it completely covers up a cavity through which the arm is extended, to protect the projector against dust from the outside. Various control buttons can be located externally of the case of the projector 112 such as elevation control 131 comprised of a stud 132 moved in or out of the projector 112. A lens 133 is recessed and protected by a glass cover 134, which in turn can be protected by a sliding door (not shown), when the projector is not in operation.

FIG. 26 shows projector 112 in a position when a conventional reel could be used for the projection. In this position the supply reel is installed on stud 135 which can be moved up or down in a slot 136 when a cartridge is mounted on it. A block 137 is provided for use as a film guide for the take-up reel. As shown in FIG. 26, the auxiliary exposure assembly 128 is in its operating position and has the same mounting apertures as the corresponding cartridge, shown in FIG. 25. Studs 138 being an auxiliary mounting for the exposure assembly 128.

Figure 27:
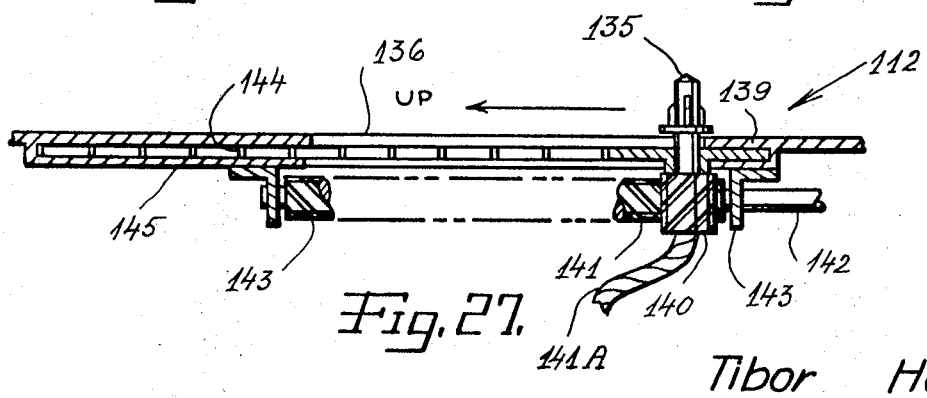
FIG. 27 is a fragmentary sectional view of the rewind mechanism for the cartridge, taken on line 27—27 of FIG. 26.

FIG. 27 shows the supply reel stud 135 supported by a plate 139. The stud 135 is mounted with a 45° helical gear 140 which is meshed with an elongated 45° helical gear 141. The stud 135 and the gear 140 travel along the slot 136, shown in FIG. 26. The gear 141 is mounted on a shaft 142 which is driven by a power source (not shown). The shaft 142 in turn is supported by two brackets 143. The plate 139 is held in a downward position by a spring 144. Both the spring 144 and the plate 139 are disposed in an enclosure 145 built in the wall of the projector 112.

Referring now to FIG. 28, there is shown a cartridge body 146 having a cover 147 in an exploded position for showing the details therein. Within the cartridge body 146 is located a main block 148 having two side portions 149 and 150 held together by a plate 151. The block assembly supports a pair of guides 152 and 153 which reach into the film roll 154 which in turn is supported by a supply core 155 and enclosed by a take-up cylinder 156. The core 155 and cylinder 156 combination are of this embodiment. The supply core 155 has an aperture 157 for mounting the stud of the projector hereindescribed. The cartridge, as shown in FIG. 28, can be used both in a camera or in a projector. When the film is developed a seal 158 is removed to open a slot. Another slot 159 extends over the walls of that area to provide a space for the firm 154, when the cover 147 is reinstalled.

FIG. 29 shows a channel 160 gradually bent toward a 90° angle at its mid section where a window 161 is provided for exposure of the film. Two ends of channel 160 are wider to allow curvature of the film 162 in its transfer operation. In addition, on two sides of the channel 160, there are located two curved plates 163 and 164 which serve as double purpose. The first purpose is to keep the light out of the cartridge interior and the second is to provide a smoother travel of the film within the system and thereby preventing it from rubbing against other elements of the projector or camera.

Referring to FIG. 30 there is shown another exposure assembly including a channel 165 enclosing a film strip 166. The channel 165 is bent in such a manner that the film is guided up to an exposure window 167 and back into the cartridge. The two ends of channel 165 are widened to allow curvature of the film 166.

FIG. 31, shows an exposure assembly comprising a pair of blocks 168–169. Within the blocks are located two rollers 170 and a pair of guide cavities 171. In each cavity there is located two slots 172 in which studs 173 and parts of rollers 170 are disposed. Springs 174 urge rollers 170 towards one end of each cavity 171 through the studs 173, located at both ends of the rollers 170. Thus the rollers 170 act as cushions to the intermittent action of the film advancing claw as hereinbefore described. In addition the exposure assembly includes apertures 175 and 176 which are provided for the use of automatic controls as described in FIGS. 21 and 22.

It should be understood that when the exposure assembly of FIG. 31 is used in a cartridge the corresponding projector should have a picture frame bracket which has enough pressure against a film 177 as shown moving past opening 178 for preventing jerking of the film 177 by the moving of rollers 170.

FIG. 32 shows still another exposure assembly comprised of an exposure block 179 and two side blocks 180 and 181. Furthermore the exposure assembly of FIG. 32, includes a back-up block 183, a pair of film guides 184 and 185 which are partially shown opposed in exposure opening 186. In addition, there is a half cylinder 187 which keeps the tension of the film 188 by the help of spring 189. It should be understood that sprocket 182 acts as a means for driving the film and in which there is an aperture 190 matching a corresponding stud of an operating mechanism herein described.

Referring to FIGS. 33 to 37 there is shown various cam operable mechanism for operating the film within the exposure assembly. FIGS. 33 and 34 show a cylinder 191 having a cam groove 192. FIG. 33 shows a cylinder 191 extended to show the complete surface with the full groove 192. It should be noted that the peaks of the groove 192 represent the number of teeth in the corresponding sprocket provided in FIG. 34.

In the operation of this system, one picture frame has one perforation on either side of the film which is operable by an arm 193 pivoted on a pivot 194. One end of the arm is equipped with a pin 195 slidable in the groove 192. The other end of the arm 193 is formed a fork 196 producing a slot wherein a pin 197 is mounted. The pin 197 is mounted on a disk 198 which is located on a rotatable shaft 199. Located under cylinder 191 is a shield 200 supporting the pin 195 within the groove 192. The cylinder 191 is mounted on a shaft 201 which is equipped with a spring 202 having a ball 203 at its end which in turn is operable for setting sprocket assembly 204 at a correct position. The sprocket assembly 204 comprises a pair of different sized sprockets to provide use for two different types of film. A groove 205, located around the periphery of the smaller sprocket, permits a fork 206 to enter and support the sprocket assembly 204 onto the shaft 201. Supporting the fork 206 for manual control is a shaft 207.

Cooperating with the elements of FIG. 34 herein described is a picture frame and film guide assembly 208 which comprise a hinge 209 on which the assembly 208 is rotatably mounted. The assembly 208 also includes a picture frame and film guide bracket 210 which is curved to mesh with the periphery of the sprocket assembly 204 and with slots 211 and 212 providing room in which the teeth of the sprockets can enter, when the frame assembly is in a closed position. In addition, there is a third slot 213 which provides for the fork 206 to be guided therein. The film guide bracket 210 is slidably mounted on a bracket 214 which has two protrusions 215, one of which is not shown, to provide for accurate positioning of the guide 210. In addition, the bracket 214, is also provided with two slots 216 which guide the ends of the fork 206 and prevent them from accidentally shifting while the bracket is in a closed position. By use of this interlocking system a tear of the film is prevented. Therefore, as noted, the only position in which shifting of the sprocket is possible is when the assembly 208 is in an open position permitting a film to be disengaged from the sprocket assembly 204. A housing assembly 217 is provided to form an insulation from the noise created inside, by the mechanism hereindescribed.

FIG. 35 shows still another alternate method for providing a movement of the film within the cartridges shown in FIGS. 1 to 19, when said cartridges use the exposure and guide assembly of FIG. 38 as hereinafter decribed, wherein there is shown a cylinder 218 with a groove 219 in an extended position to show the whole surface of the cylinder. Within the groove 219 there is slidably guided a pin 220 which is extended from one end of a bar 221. The bar 221 being slidably mounted on supports 222. At the mid-section of bar 221 is provided a slot 223 in which there is guided a pin 224 supported by a disk 225. The number of peaks of the groove 219 indicate the number of picture frames operable by this mechanism.

FIG. 36 shows still another system of film advancing mechanism in which there is shown a cylinder 226 again in an extended position to show the whole surface of the cylinder. The cylinder 226 includes a groove 227 into which a square pin 228 is extended from one end of a bar 229. The bar 229 is slidably mounted on supports 230. At one point of bar 229 there is shown slot 231 into which a pin 232 extends from one end of another bar 233. The other end of the bar 233 is pivoted about a pivot 234. Located between the pin 232 and the pivot 234 is a plate 235 which is attracted by electromagnetic means 236 and 237 at predetermined intervals. Located here again on the groove 227 are a number of peaks which indicate the number of picture frames operable by said groove.

FIG. 37 shows an additional mechanism for driving the film in which there is shown a cylinder 238 with a cogwheel shaped opening 239 at its end portion into which a pin 240 extends from a bar 241. The bar 241 is slidably mounted within supports 242 and operable by a mechanism similar to that shown in FIGS. 35 and 36. Points 243 within aperture 239 indicate half the number of picture frames operable by said mechanism.

It should be noted that in FIGS. 33 and 35 the ratio between the width of the peaks and the distance between said peaks, in the grooves 192 and 219 will determine the ratio of the time spent between the standing and the moving picture frame. The same ratio of FIG. 36 is determined by the time it takes for the pin 228 to travel from peak to peak and the time interval of the activated electromagnets 235 and 237. The ratio of the aperture 239 of FIG. 37 is determined by the diameter of the cylinder 238 and the number of points 243.

FIG. 38 shows another type of an exposure assembly which comprises two blocks 244 and 245 enclosing a sprocket 246 which engages a film 247. The sprocket 246 is provided with an aperture 248 which can engage a stud, similar to shaft 201 of FIG. 34 and thereby operable by the mechanism described in FIG. 34.

It should be noted that since there are more than one tooth engagements with the film at all times, when the sprocket is used to operate the cartridges, there is a less chance of a tear of the film or misalignment of the film in the exposure assembly even if there is a buckling or excessive rubbing of the film roll in said cartridges. It should be also understood that another advantage of this system is that the same camera or projector could operate both the so-called super 8 and the regular 8 millimeter type of film cartridge without any adjustment of the camera or the projector since each cartridge carries its own sprocket and a prism to set the frame sizes.

FIGS. 39 to 59 show a cartridge apparatus in accordance with another embodiment of the invention. Specifically FIG. 39 shows a film guiding channel assembly which can be used with the cartridges of this invention as best shown in FIG. 58, comprising two channels 249 and 250. It should be noted that one end of the channels are widened to provide for the curvature of film 251. The other ends of the channels are mounted on a plate 252 which is equipped with a seam 253 on all sides to match corresponding grooves in the wall of the cartridge as shown in FIG. 58 thus keeping the light out of the cartridge interior as shown in FIG. 58, a window is provided for reading marks 254 located on plate 252 which indicates the amount of film within the cartridge. The plate 252 is slidably mounted inside the wall of the cartridge as best shown in FIG. 58.

Figures 46, 47:
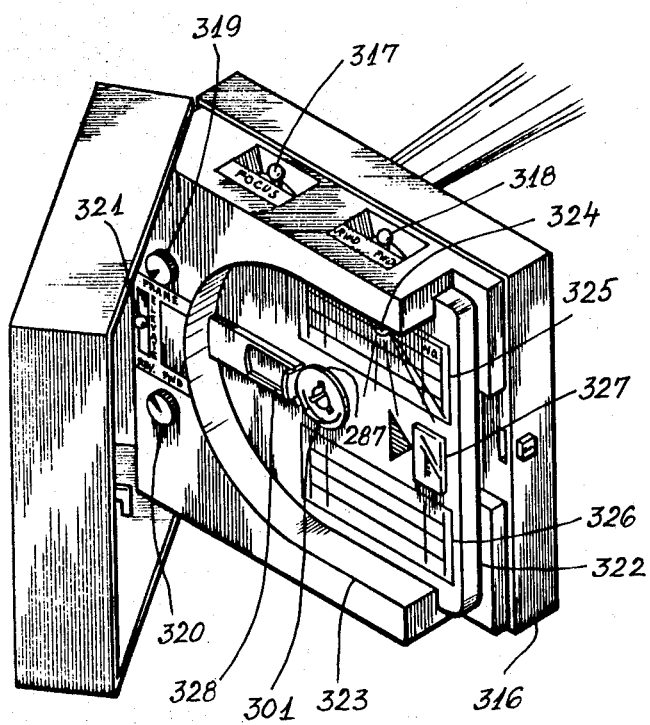
FIG. 46 is an isometric view of a movie projector operable with the cartridge of FIG. 43.
FIG. 47 is an exploded isometric view of a loaded container used to transfer the film from a conventional roll.

FIG. 40 shows a further exposure assembly comprising a block 255 on which is mounted two movable film guiding arms 256 and 257. The two arms 256 and 257 are positioned within the cartridge to form a mirror image of each other thereby guiding a film 258 through an exposure aperture located within another channel 259 which has a window 260 cut out of both sides of a channel. One side of the window 260 is opened for permitting the operation of an automatic film controlling mechanism, such as the mechanism shown in FIGS. 21 to 23. Then, when a guide and exposure assembly of FIG. 40 is used in a cartridge, film projection could be started by simply sliding the cartridge into the cavity of a mechanism as shown in FIG. 46. The film 258 is threaded around two triangular blocks 261 and 262, as it passes window 260. It should be noted that one side of the blocks 261 and 262 are finished to a smooth cylindrical form. The triangular blocks 261 and 262 are pivoted on pins 263 suspended on plate 264 and thus are provided with small degrees of turns following the guidance of the film 258 when the arms 256 and 257 sweep across from their one extreme position to the other in the process of transferring the film from the supply reel to the take up reel. The block 255 and channel 259 are also mounted on the plate 264. It should be noted that the exposure assembly of FIG. 40 is used in the cartridge of FIGS. 41 and 42, in the transfer mechanism shown in FIG. 43 and in the cartridge shown in FIG. 52 as hereinafter described.

FIGS. 41 and 42 show a cartridge apparatus comprised of a case 265, a cover 266, a supply cylinder 267 and a take-up cylinder 268. The supply cylinder 267 and the take-up cylinder 268 are coaxially supported within the cartridge case 265. At the center axis of the cylinder 267 there is an integral pin 269 which in turn is connected to the take-up cylinders 268 through a coil spring 270. The coil spring 270 is positioned in such a manner that when the full roll of film is on the supply cylinder 267 the spring is fully wound, thus providing tension in the film within the exposure aperture since the take-up cylinder 268 rotates slightly faster than the outside supply cylinder 267. The gradual unwinding of the spring 270 actually will help the cartridge operation. On the arms 256 and 257 there are mounted a set of springs 271 and 272 for supporting a supply roll of film 273. FIG. 41 shows how the film 273 is guided between the springs 271 and 272 when being transferred from the supply cylinder 267 to the take-up cylinder 268. The arm 257 is also equipped with a bar 274 which supports a plate 275 marked to indicate the amount of film within the cartridge. Located on the cover 266 of the cartridge is a window 276 for observation of the plate 275. Located on the outside end of the take-up reel 268 is a plurality of grooves 277 for cooperating with a plurality of concentric ridges (not shown) located adjacent the opening provided in the cover 266 of the cartridge so that a suitable light lock is provided around the opening. The cover 266 is shaped to follow the contour of the exposure assembly as shown in FIG. 40. In addition, it has an opening 278 about the same size as window 260 of the channel 259. A pair of plates 279 and 280 are used for enclosing the roll of film 273. The cartridge hereindescribed in FIGS. 41 and 42 can be used both in a camera or in a projector shown in FIGS. 43 to 47.

Figures 43, 44, 45:
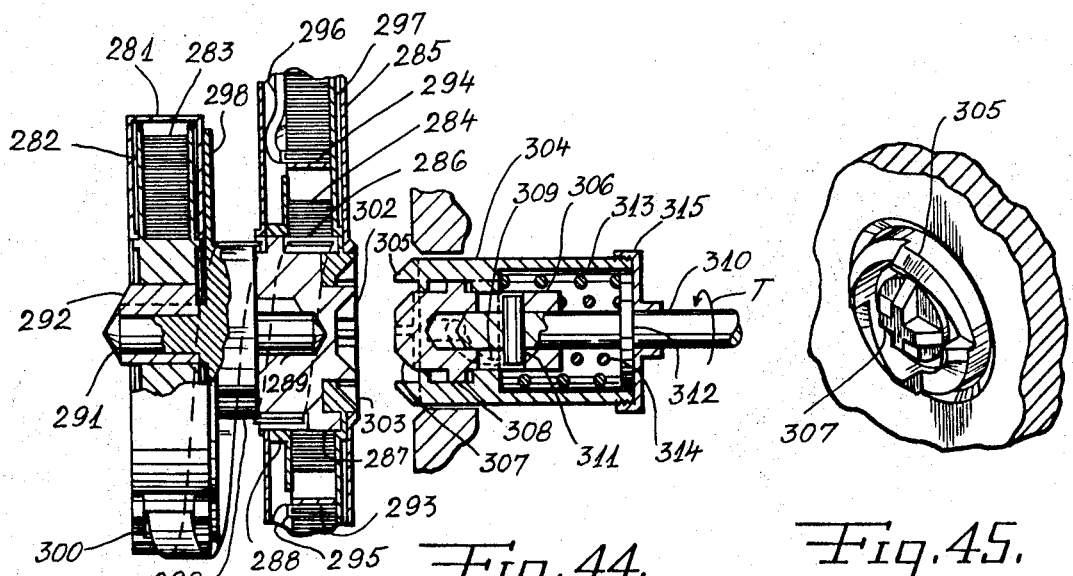
FIG. 43 is a fragmentary sectional view of middle portion of a cartridge with its reels, illustrating the installation of a conventional spool of film or tape being transferred onto a cartridge of this invention.
FIG. 44 is a sectional view of a drive mechanism which automatically engages or disengages the supply or the take-up reel of the cartridge of FIG. 43.
FIG. 45 is an isometric view of an element of FIG. 44.

Referring now to FIGS. 43 to 47, and particularly to FIG. 43, there is shown a cartridge transferring unit using components, similar to that shown in FIGS. 40 to 42. The mechanism, shown in its midsection of film transfer operation, comprises a container 281 enclosing a reel 282 loaded with film 283. The film 283 is spliced with a film 284 in a cartridge 285 and guided into said cartridge 285 through a helically curved panel 286 which is built into a center supply core. One end of the center supply core 287 is provided with a ring 288 to guide the film inside the cartridge and also to stop film guide arms 295 and 296 from overloading of the cartridge. The center supply core 287 is also provided with an aperture matching a stud 289 of an adapter 290. The other end of the adapter 290 is also supplied with a stud 291 supporting a hollow stud 292 which freely rotates on stud 291. The stud 292 matches an aperture in the reel 282. Springs 293 and 294 are mounted on arms 295 and 296 for operating the same. Located within the receiving cartridge is a take-up reel 297. It should be noted that the adapter 290 is also equipped with a plate 298 having slots for matching ridges 299 of the container 281 as best shown in FIG. 47. Therefore, container 281 and adapter 290 can rotate together. An aperture 300 is provided on said container for permitting the film 283 to unwind from the reel 282 without having to remove it from the container.

In the operation of this unit to install a film into an empty cartridge the film from a reel should be spliced to an already factory installed film extending out from the supply reel 287, as shown in FIG. 46, and by a fast forward or just a simple regulating operation of the cartridge, the film from reel 283 will be fed into the take-up reel 297 of the cartridge 285. To the end of the fed in film, a strip of factory prepared film should be spliced which would activate the film control mechanism, as shown in FIGS. 21 to 23.

In the operation of the unit, in order to add film into an already partially filled cartridge, the factory prepared end should be pulled out of the cartridge and removed from the end of the film located inside the cartridge. After splicing the new roll of film the adapter 290 and the new roll 283 with the container 281 should be mounted on a unit as shown in FIG. 43. It should be noted that regardless of the position of the film inside the cartridge as to whether the film is completely on the take-up reel 297 or not, the operation of the fast forward wind or the normal projection operation can begin. It should be noted that if the film inside the cartridge is on the supply reel 287 it will unwind first, turning the adapter 290 and the container 281 with the roll inside, at the same speed. Therefore the roll in container 281 will not unwind until the supply reel 287 in the cartridge is completely empty because the supply reel will stop rotating holding the adapter 290 and the container 281 from rotating and consequently the continued rotation of the take-up reel 297 will start pulling the film 283 through the channel 286 and the opening 300 from the reel 282 which is by that time already in a rotating momentum. When the film reaches its end, the previously removed factory prepared strip can be spliced to it.

As noted in FIG. 43 one side of the cartridge is provided with a receptacle 302 located in the supply core 287 and a receptacle 303 located in the take-up reel 297 to match the forward and rewind mechanism illustrated in FIG. 44.

The forward and rewind mechanism shown in FIG. 44 comprises an outer cylinder 304 having at one end four teeth 305 forming the shape of a ratchet which is best shown in FIG. 45, for allowing only one way drive. In addition the mechanism includes an inner cylinder 306 having at one end four teeth 307 shaped in a cross-like manner. Circumferentially equally spaced studs 308 located on its cylinder provide for cooperative engagement with four grooves 309 and the cylinder 304. One half of the path of the four grooves 309 is formed parallel with the axis of the cylinders and the other half extend in helical directions. The helical ends of the grooves are opened to allow an easy assembling of the two cylinders while the other ends are closed to protect against dust or other materials from entering the mechanism. The cylinder 306 is slidably mounted on a shaft 310. A pin 311 is mounted on the shaft to carry cylinder 306 within the shaft 310 and to also control the extent of the axial sliding motion of the cylinder 306. There is also provided a flange 312 to back up springs 313 and 314. Closing the end of the cylinder 304 is a plate 315 which is screwed on the cylinder 304.

It should be noted that if the shaft 310 is rotated in a direction opposite to that shown by the arrow T, only the supply reel 287 will engage due to the manner in which the teeth 305 are shaped, in addition due to the take-up reel 297 being rotatable at a slower speed than the supply reel 287.

When the shaft 310 is rotated in the direction of the arrow T both of the sets of the teeth 305 and 307 will be engaged but the resistance of the take-up reel 297 to the cylinder 304 will turn the cylinder in an opposite direction until the cylinder 306 is forced to retract because of the helical section of groove 309. It should be noted that if the resistance of the take-up reel is not sufficient to retract the cylinders 306, then same supply reel 287 is turning faster than the take-up reel 297, it will force the cylinder 306 to retract.

FIG. 46 shows a movie projector that can cooperate with a cartridge of FIG. 43. The movie projector comprises a body portion 316 having a focus control 317, a fast forward and rewind control 318, a frame control 319, a reverse and forward control 320 and an elevating control 321 located at the usual position. Since the picture frame bracket and the film cannot be tilted, and since the tilting of body 316 is not practical, the solution lies in tilting a mirror or prism disposed between the film and the lens, simultaneously with said lens. Thus provision is made for an adequate elevating control system. Mounting in the body 316 of the projector is a cartridge 322 similar to the cartridge of FIG. 43. The body 316 also has a U-shaped opening to provide space for film installation described in FIG. 43. There is a small light bulb 324 for providing light for labels 325 and 326 and in addition there is provided a counter 327 in the unit shown in FIG. 46. On the cartridge 322 is located a small slide window 328 for providing manual reinserting of a film end 301 into the middle core 287 when said film end accidentally slips into the cartridge. The above described projector should be started with a projection of a film automatically as soon as a cartridge is inserted into it.

Referring to FIG. 47 there is shown an upper cylinder half 329 and the lower cylinder half 330 of a reel container 281, used in FIG. 43. The upper cylinder half contains a loaded reel 282 with a film 283. At one end of the upper cylinder half 329 is located a hook 331 engaging with a corresponding end 332 of the lower cylinder half 330 when assembled. The lower cylinder half 330 is provided with a projection 333 shaped for insertion into a corresponding cavity 334 in the upper cylinder half 329 of the unit. In addition the same end of the upper cylinder half has an extending tongue 335 for insertion into a corresponding slot 336 in the lower cylinder half 329. In this method a sideway sliding of the upper cylinder half, the cylinder and lower cylinder half is prevented. At the mounting edges of both halves there are provided with shaped plates 329 disposed so that a rigid side mounting is produced when the container is of a large size. It should be noted also that the shape of the plate 337 holds the two halves together. In addition it should be noted that using these plates with 90° corners for mounting only, would still require another means to hold the halves together.

An opening 338 is formed by the two halves 329 and 330 for the lead of the film to extend out of the container when it is closed. In addition a tongue 339 reaches into the container to help regain the end of the film when it is lifted back within the container. By rotating reel 282 manually in the opposite direction from that which the roll of film is wound on the tongue 339, will scoop the lead out of the container.

When the roll of film is completely unwound from the container, a provision is made to rewind the film into the container by preparation of the reel 282 indicated at point 340. A factory prepared incision within the body of the reel, making a resilient tongue, may be done at several places at least one side of the reel. The tongue will catch the end of the film thus making the rewinding operation possible without opening the container. If the container is not used it eliminates the often nerve racking process of making the film end catch. In addition there are provided ridges 341 for the centering of the reel into the container without having the sides of the two rubbing against each other. A sufficiently large sized groove 342 should be provided for the reel 282 to ride on the ridge 341.

Referring to FIG. 48 the is shown a section of an exposure apparatus illustrated in FIGS. 40, 41 and 42 comprising the cover 266, the block assembly 255 located within the body of the cartridge 265, part of the supply reel 267 and the film 273. In addition there is provided a plate 343 covering one side of the exposure aperture having a groove 344 to provide room for the end of an ordinary film advancing claw. Further there are provided a number of other grooves 345 by the channel 259, plate 264 and a ridge 346 formed in the body of the cartridge 265 matching corresponding ridges in the camera. Since above described apparatus is to be used in both camera and projector, plate 343 should be removed after film is developed. The ridges thus provide for a light tight mounting of the cartridge within the camera. By means of this arrangement it is not necessary for mounting the cartridge fully within the camera but one portion as shown in FIG. 49, can be exposed for viewing the equipment on the cartridge such as an indicator 347.

In FIG. 49 there is shown a cartridge 348, similar to the cartridge of FIGS. 41, 42 and 48, being installed in a camera. Said camera is equipped with an entrance 349 which permits only insertion of the cartridge into the camera in one way, as best shown in FIGS. 50 and 51.

Referring to FIGS. 50 and 51 there is provided a partially shown body 350 of the camera, an entrance frame 351, and a door 352 specially shaped to fit the front end of the cartridge, such as the cartridge shown in FIGS. 41 and 42. The door of the camera 350 is hinged on a frame 351 by means of pins 353 which extend out of the door 352 at both ends. A spring 354 is provided across from one of said pins to the other. Two ends of said spring are lifted around said pins thus holding the door 352 in a closed position. At the bottom end of the door there is shown a strip 355 which is provided with a slot 356 from end to end. The strip is supported by spring 357 which keeps the strip 355 pressed against the bottom of the door 352. In this manner the door cannot be opened until the strip 355 is pressed down, which can only be done by the proper insertion of a cartridge. When the cartridge is removed the door 352 automatically closes. In addition there is provided room 358 permitting a full 90° turn of the door. This system eliminates the need of having to open and close a door when installing or removing a cartridge from the camera.

More specifically FIG. 52 shows a cartridge 359 for use for recording tape. The cartridge 359 is of a similar configuration as the cartridge of FIGS. 41 and 42. The cartridge 359 comprises a supply reel 360, a take-up reel 361, a roll of recording tape 362, two guide arms 363, 364, a set of springs such as springs 271 and 272, shown in FIG. 41, to keep the outer roll of tape from collapsing and another spring such as spring 270, shown in FIG. 41, connecting the supply and take-up reels for providing tension in the tape. In addition the cartridge 359 includes two rubber rollers 365, two pads 366 and two conducting plates 367 which are connected to conductive strips 368 and 369. One end of said strips is positioned in the cartridge in such a manner that it gently rubs against the backside of the recording tape 362. Since both ends of the tape 362 are prepared with a strip of conductive material such as aluminum foil the plates 367 are electrically connected, thus providing a closed circuit for the apparatus to which they are connected, such as the apparatus of FIG. 53, as hereinafter more fully described. Therefore provision is made to activate a desired mechanism such as a relay or other electrical mechanism for the start, stop or rewind of the cartridge.

The arm 364 is equipped with a support 370 which holds a gear strip 371 which in turn meshed with a gear 372 which is mounted on the bottom of an index plate 374. By this method a greater quantity range is provided on the indicator 374 for more accurate reading through a window 375. The arm 364 also supports a block 376 which is equipped with a button 377 which extends or retracts through an aperture 378 depending on the position of the arm 364. Plates 379 and 380 are used for enclosing the supply and take-up reels with the roll of recording tape. One end of the supply reel 360 is provided with a hollow cylinder 381 which is divided by a rib 382 for providing a connection for a drive element or the cylinder may conform to a connection similar to that of FIG. 43 which can be driven by its corresponding drive shown in FIG. 44.

Figure 53:
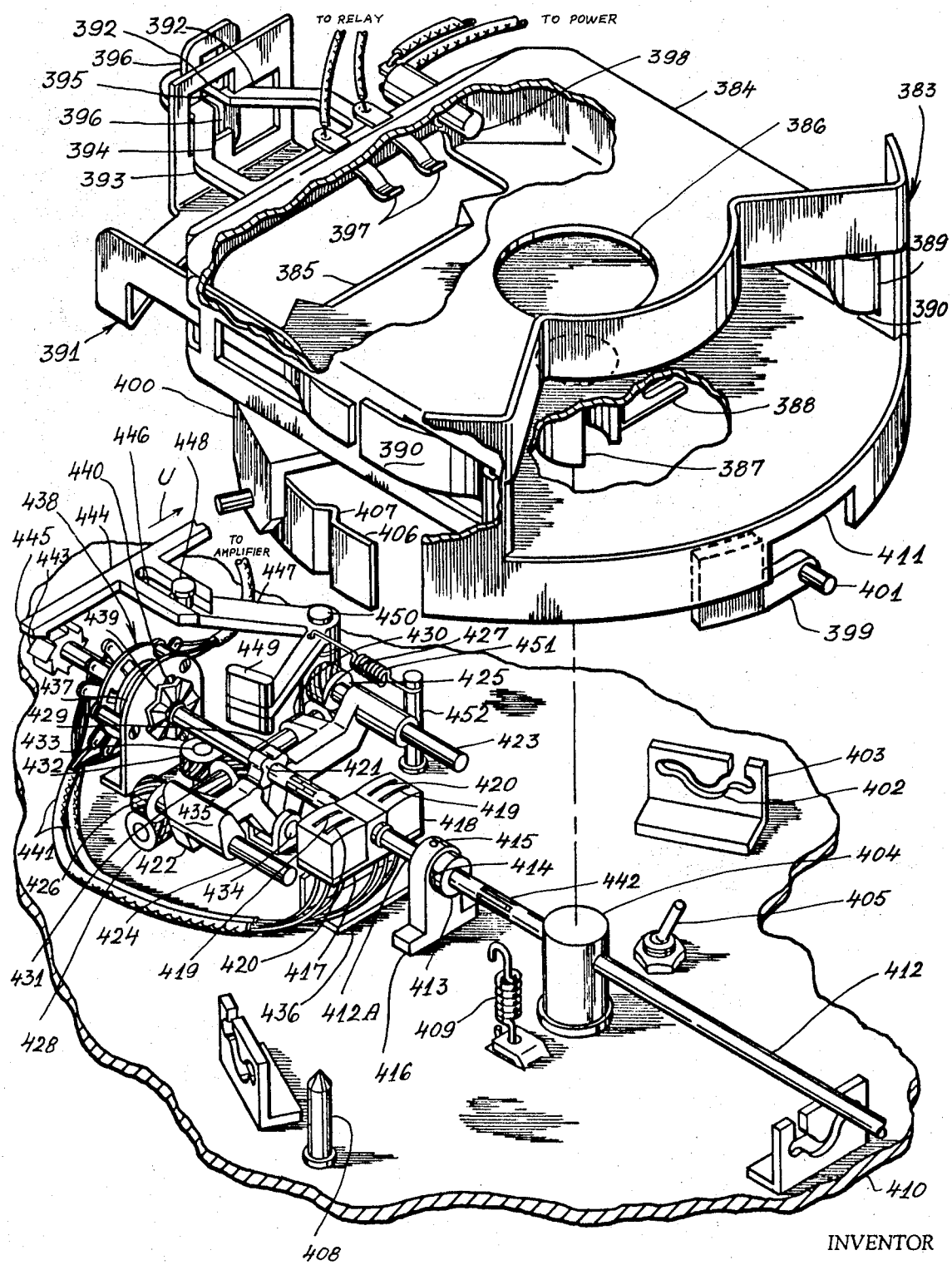
FIG. 53 is an exploded isometric view of a cartridge supporting case and a corresponding automatic 8-track recording system that can operate with the tape cartridge shown in FIG. 52.

Referring to FIG. 53, there is shown a related cartridge mechanism with a cartridge housing 383, for supporting a cartridge as described in FIG. 52. The mechanism of FIG. 53 comprises a main body portion 384, one end of which has an opening 385 and is shaped to receive the front end of the cartridge shown in FIG. 42. On the top of the housing 383 is located a circular opening 386 for admitting a drive element to engage the cartridge when the cartridge is inside the housing 383. On the bottom of the housing 383 is located a split cylinder 387 on which is mounted a fork 388. Two sides of the main body portion 384 is provided with slots 389 into which two springs 390 extend. The end opposite to opening 385 of the main body 384 is provided with a large aperture through which the cartridge can be inserted. This end is curved, having the center point of its radius the same as the circular opening 386.

At the end of the body portion 384 which has opening 385, a spring assembly 391 is provided with two square holes 392 overlaying each other at one corner. Within the holes 392 extend a bracket 393 which is mounted on the body portion 384. The bracket 393 has a large opening 394 with a slot 395 at one end. At this end of the bracket 393 there is supported two L-shaped brackets 396 having slots matching the slots 395. Two spring contacts 397 are located above the bracket 393 for contacting conducting plates 367 of the cartridge of FIG. 52. A push-button switch 398 is located on the right side of the cartridge.

On the bottom part of the cartridge there is provided a bracket 399 and two matching brackets 400. The three brackets are equally spaced within a 360° radius with the brackets 400 located on each side of the opening 385 of the main body portion 384. Each bracket is provided with a stud 401 which fits into cam grooves 402 of three supporting brackets 403.

A support 404 fits into the cylinder 387 and a toggle switch 405 fits into the slot of the fork 388. On one of the brackets 400 is located a spring 406 having an indent 407 which is aligned with a stud 408. A helical spring 409 is hooked onto a chassis 410 at one end with the other end hooked to the main body 384. The split of cylinder 387 and a cut-out 411 on the main body 384 is utilized to provide room for a control shaft 412. The shaft 412 supports a head position control cylinder 413 which has a continuous groove 414. A pin 415 extends into the groove 414 from a block 416. A head supporting bracket 417 is mounted on the shaft 412 in such a manner that it can rotate without sliding. On the bracket 417 there is located two combined recording and erasing heads 418 having recording head units 419 located diametrically opposite from each other and erasing head units 420 also located diametrically opposite from each other. By this arrangement a two-way recording can be made.

On the shaft 412 behind the recording heads 418 is located a cam block 421 having four equally spaced protrusions and four equally spaced indents. Under the cam block 421 is located a V-shaped arm 422 supporting two capstans 423–424. At one end of both said capstans 423–424 there are two 45° helical gears 425–426. One of said gears is constructed with a left handed helical gear. Meshing with said gears are two other helical gears 427–428 which are mounted on the end of a shaft 429. The shaft 429 is supported by a fork unit 430 which is part of the arm 422. On the middle of the shaft 429 there is located another helical gear 431 which meshes with still another helical gear 432. The helical gear is mounted on a shaft 433 which is joined by a power source (not shown). The arm 422 is pivoted on the chassis 410 by means of a pin 434. The arm 422 has two protrusions, identically sized to the indents of the block 421 and are positioned in such a manner that when one protrusion of the arm 422 is in one indent of the block 421 the other is on the top of one protrusion of said cam block 421. Thus for every ⅛ of a turn of said cam block 421, it would alternately raise or lower each side of arm 422. On the side on which the capstan 424 is located there is a cam elevation means 435 which raises or lowers spring assembly 391 when the housing 383 is mounted on the chassis 410. A bracket 436 is mounted under the heads 418 to prevent excessive turn of said heads. A bracket 437 supports a selector assembly 438, which is hereinafter more fully described and shown in FIG. 54. On the other side of the bracket 437 there is located a plate 439 which has eight axially directed indentations in which a spring operable ball 440 sets the correct position of the shaft 412 and its components.

Connecting the heads 418 and the selector 438 are two sets of shielded wires 441. There are also two sets of teeth 442 supported on a shaft 412 to allow a mid-section shaft 412A to axially slide with the heads 418.

At one end of the shaft 412 is a mounted ratchet like gear 443 and operable by a sliding bar 444 which is, at one end, connected to the moving part of a relay (not shown). The other end of the bar 444 is equipped with a claw 445. In addition on one side of the bar 444 is located a fork 446 which is hooked up to an L-shaped arm 447 by a pin 448 extending through one end of that arm. The other end of the arm 447 is furnished with a block 449. The arm 447 is pivoted by pin 450 with a spring 451 connecting the arm to a stud 452. When the housing 383 is in an operating position the block 449 is disposed in the middle of the opening 394. The height of the block 449 is just below the upper edge of the holes 392 of the assembly thus enabling the block 449 to fit through the holes 392 into slot 395 when they are correctly aligned.

In the operation of the above described apparatus shown in FIG. 53, when the cartridge of FIG. 52 is inserted into the housing 383, depending on the position of the button in said cartridge, the assembly 391 will either stay in the same position or be moved horizontally shifting the lower square hole 392 in front of the slot 395. Then as the insertion continues the power switch 398 turns on the power and when the cartridge is completely installed the spring contacts 397 will make contact with the plates 367 of the cartridge. If the position of the recording tape, in the cartridge, is so that one of its conducting ends causes a short between the spring contacts 397, and the button 377 is in its retracted position, a relay (not shown) will be activated and the bar 444 will move in the direction of the arrow U. The bar 444 will then turn the arm 447 which in turn will slide the block 449 into the slot 395. The follow through claw 445 will turn gear 443 ⅛ of a circle. In addition it will turn the shaft 412 and its components except the head assembly 418. The head assembly will be switched to a different track. When the block 421 turns 45° from the position illustrated in FIG. 53, the capstan 423 will be lowered and the capstan 424 will be raised with the cam elevation means 435. The elevation means 435 will urge assembly 391 in an upward direction so as to raise the square holes 392, but since the block 449 is in the slot 395 the square apertures 392 will remain in their original position. This takes but a split second because as soon as the magnetic force in a relay holding the bar 444 delays the spring 451 pulls the arm 447 back towards its original position and the square holes 392 will snap up to a position in which the block 449 cannot enter slot 395 until the tape reaches its other end in which case the button 337 will be in its extended position. Thereby assembly 391 will move and lower the square hole 392 in the front slot 395. In this manner a correct alignment of the block 449 will be presented. When the tape reaches at its other end a similar action takes place, started by a relay to change the positions of capstans 423–424 back to their original position. It should be noted that after block 449 is retracted from the slot 395 the assembly 391 will snapdown preventing the reentry of the block 449 into the slot 395 until the film is returned to its original end whereby the button 377 is retracted. Meanwhile the recording heads 418 have changed their position once and the connections on the selector assembly have changed their positions twice. It should be noted that the reason for this is that every second time, shifting the heads is done electrically. Only when the head assembly 418 has traveled over the tape in both ways will the position of the head assembly 418 change mechanically. It should be noted that each time the capstans 423–424 change positions the motion of the tape will be reversed.

When a fast forward motion of the tape is desired the case 383 would be twisted in that direction. Direction of the moving tape can be observed through the window 375. As the studs 401 ride in the groove 402, the housing 383 in FIG. 52 will be raised disconnecting the tape heads 418 and the capstans 423 and 424 engage a drive mechanism which will extend into the hole 386. The fork 388 will also turn on the three positioned toggle switch 405 which in turn will turn on the drive mechanism in the proper direction. When the tape reaches its end, a relay will be activated in the already described manner, snapping back the housing 383 into a playback position, and since the block 449 is able to slide in slot 395 the relay will follow through turning the gear 443 and thereby changing the track. It should be noted that if it is desirable to rewind the tape the housing 383 can be tilted in the opposite direction and thereby the position triggers an operation similar to that above described, in the reverse sense. However, when the tape reaches its beginning the assembly 391 with its misaligned and square holes 392 will not permit entry of the block 449 into the slot 395, thus only the housing 383 will snap back to its original position and the heads 418 will not change their position either electrically or mechanically, because the block 444 is stopped before the claw 445 could turn the gear 443.

If the bar 444 had not stopped from turning the gear 443 after the housing 383 had snapped back into the playback position, capstans 423–424 would have changed positions and the tape would have been completely unwound from the reel in the cartridge. In addition it should be noted that the stud 408 and the spring 406 would set the correct alignment of the case 383, with heads 418.

Figure 54:
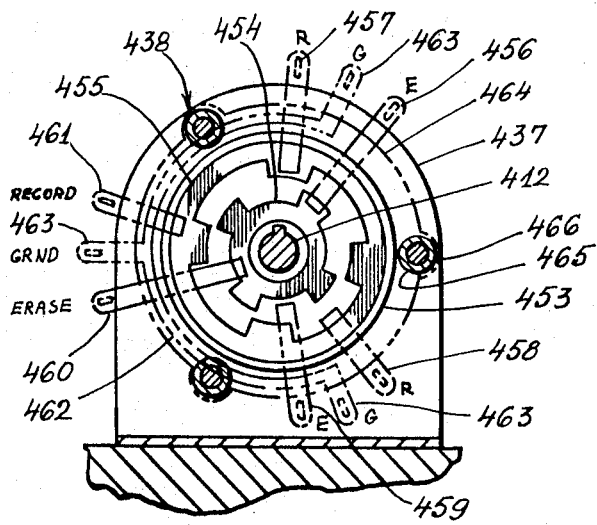
FIG. 54 is an enlarged sectional view of a selector element of the cartridge system shown in FIG. 53.

Referring to FIG. 54 there is shown the selector assembly 438 with the bracket 437 described in FIG. 53. The selector assembly 438 comprises a disk 453 made of insulating material and is mounted on the shaft 412 as hereinbefore described. The disk 453 has two conducting ring plates 454, 455. The plates 454, 455 are shaped for providing at every 45° turn of the disk 453 an alternate connection of contacts 456, 457 and 458, 459. Also contacts 460–461 have contact connections to the plates 454 and 455. Located on plate 464 is a ground strip 462 having three tabs 463. The contacts and the ground strip are mounted on a stationary disk 464 which is supported by a bracket 437 through spacers 465 and hardware 466. Contact 456 to 459 are connected to the head assembly 418 shown in FIG. 53 while the contacts 460 and 461 are connected to an amplifier.

Figure 55:
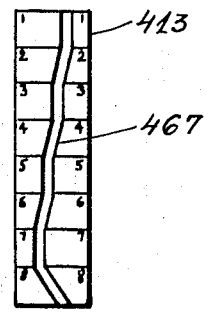
FIG. 55 is an extended surface view of a cam cylinder used in the cartridge system of FIG. 53 operable for controling the recording and the erasing head settings.

FIG. 55 shows the cylinder 413 in an extended position, showing the whole surface of the cylinder whereby there is indicated one pattern of a groove in which pin 415 is guided which controls the position of the head 418 shown in FIG. 53.

Figure 56:
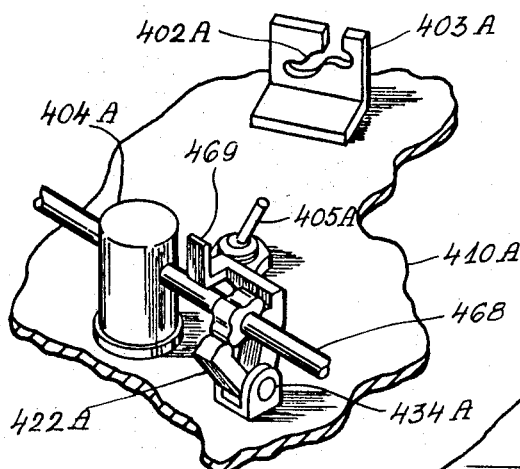
FIG. 56 is a fragmentary isometric view of a modified section of the cartridge system shown in FIG. 53 illustrating part of a mechanism which automatically positions the cartridge in a rewind state.

Referring to FIG. 56 there is shown part of an apparatus, similar to FIG. 53, in which the cartridge of FIG. 52 may be used when it is desired to have one way recordings. Primarily the unit of FIG. 56 comprises supporting brackets 403A having slots 402A, a support 404A, a control shaft 468, a toggle switch 405A, and a V-shaped arm 422A pivoted by a pin 434A on a chassis 410A in which one side of the arm 422A is provided with an extension 469 which extends into a slot on the case assembly. In addition the unit includes the switching head as shown in FIG. 53 but with both erase heads on one side and the recording heads on the other positioned on the shaft 468, the same way as the mechanism in FIG. 53. This unit eliminates the selector assembly and the capstans are replaced with one stationary capstan. The capstan supporting arm remains at least on one side, which has the elevation means to operate assembly with another amplifier 391. All the other elements of the unit of FIG. 53 is the same in cooperative relation with the mechanism just described for the unit of FIG. 56. Therefore, by the mechanism of FIG. 56 an eight-track automatically operated mono recorder is converted into an eight-track automatically operated stereo recorder.

Figure 57:
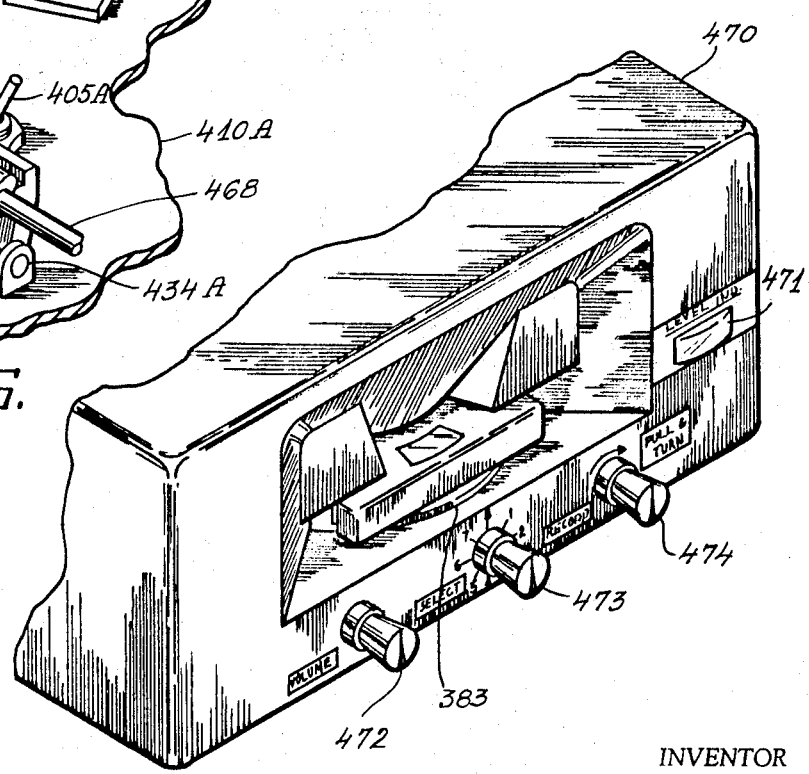
FIG. 57 is an isometric view of another embodiment of the recording apparatus shown in FIG. 53.

Referring to FIG. 57 there is shown the unit in accordance with the embodiment of the mechanism of FIG. 52 to FIG. 55 inserted within a body portion 470 which is designed for a wall or car dashboard mounting, having a recording level indicator 471, a volume control 472, a selector control 473, and a record control 474. Since the emphasis is on the compactness of this unit and not to crowd that panel with control buttons, the recording control is designed so that instead of having to press two buttons simultaneously the control will operate by pulling it first and then turned for its operation.

In a cavity of the body 470 there is installed a cartridge, such as the cartridge shown in FIG. 52, inserted in the case 383 with the quantity indicator in a clear position. In addition it should be noted that often that type of mechanism, such as that of FIGS. 53 and 54, may be used for motion picture projection.

It should also be noted that an automatically operated mechanism can be built by using parts of the mechanism shown in FIG. 35 in combination with a slightly altered case 383, FIG. 53. The alterations may comprise of an opening above the opening 385 of FIG. 53 to permit the projection.

To alter the apparatus on the chassis it would be necessary to replace the head assembly 418 with a film advancing mechanism and a light bulb. A direct current operable mechanism can be connected to selector such as the selector 438 in such a manner that one lead is connected to the contacts 457 and 459 and the other lead connected to contacts 456 and 458. The operating direct current power is then connected to the contacts 460 and 461 without a ground strip. Therefore, with every 45° turn of the selector plate 453, a change in direction of the operation of the moving claw is provided. In addition to convert this unit into a projector system the block 416 and the cylinder 413 with capstans 423 and 424 should be eliminated. In addition the drive mechanism can be eliminated except for the V-shaped arm 422 with its left side and the cam elevation means 435 and block 421. The remainder of the unit of FIG. 53 remains the same with a control button 473 indicating a forward or a reverse four times in each alternate order.

It should be noted that the film advancing mechanism could be provided to have the claw located on both sides of the arm 422 and operate in opposite directions. Thus changing the arm 422 position would result in changing the direction of the motion of the film. In this particular case the film mechanism may operate on alternating current and therefore the selector 438 may not be used.

In order to operate the above described mechanism a film cartridge should be constructed generally in the same way as the cartridge shown in FIG. 52, with two contact plates 367 and having both ends of the film roll, inside the cartridge, being prepared with a conductive material.

It is therefore understood that an assembled mechanism for a motion picture projector which, when the film reaches its end, automatically will reverse itself is provided by this type of a mechanism. A fingertip push on the proper side of the cartridge will achieve a desired fast rewind stopping automatically when the film has reached its beginning.

Referring now to FIG. 58 there is shown a cartridge base 475 partially covered with a cover 476. Inside the base 475 there is located a supply reel 477, a take-up reel 478 and a roll of film 479. A core spring can be utilized connecting the two reels in such a manner that when the supply reel is full the spring is fully wound up as shown in FIG. 41. In addition a set of springs mounted on a guide assembly 480, as shown in FIG. 39 can be used for preventing the outer roll of the film from collapsing. FIG. 58 includes also a plate 481 enclosing part of the guide assembly film and reels. The plate 481 which has an opening 482 in which the guide assembly 480 is permitted to slide to and from the center of the cartridge. On the other end of the plate 481, there is a film back-up plate 483, an exposure window 484 which has a slot 485 providing room for conventionally operating a claw. In addition there is another window 486 which permits visual access to the interior of the cartridge to determine the amount of film left in said cartridge. A passageway 487 is provided at the bottom and at the ends of the case 475 to enable the film 479 to go around the supply and the take-up reels without being exposed. Outside of the supply reel 477 is constructed a ratchet like unit 488 for providing a one way rotation of said reel. Thus when the film 479 reaches near its end, so that the supply reel is already disconnected from it, the coiled spring, which is wound between the supply and take-up reel cannot turn the supply reel backwards but will turn the pick-up reel forward pulling the rest of the film through. The pulling power may not exceed the resistance of the back-up plate 483 and the passageway 487.

Referring now to FIG. 59 there is shown two cartridges 488 and 489 mounted face to face. Enclosing them is a cover 490. The cartridges 488 and 490 are similar to the cartridges shown in FIG. 58. The difference is that each cartridge has the path of its guide assembly slightly off centered so as to give each cartridge room to be connected side by side without interfering with each other. The guides can also be located diametrically opposite each other. There is also shown a supply reel 491 of the cartridge 488 containing a roll of film 492 which film is guided up through an exposure assembly 493 and back to said cartridge 488. The film 492 is also guided through the same exposure assembly and back to its own cartridge 489. The exposure assembly 493 has an opening 495 which encloses two small blocks 496 and 497. The blocks 496 and 497 are mounted on cartridge 498 with the two film strips guided therebetween. A spring 498 presses the plate 493 and consequently presses a film strip 499 against the block 497. Thus when film strip 499 reaches its end spring 498 will move the block and the other film into the exposure window, which is provided in the cover 490. This system also provides a slot 500 in which an operating moving claw can be extended. A 45° angle cut 501 is provided to permit the moving plate 493 to extend in its fullest position, in the event spring 498 is not able to move the plate all the way. The film advancing claw will then catch onto the angle cut 501 and slide the plate to its correct position. The cartridge provided in FIG. 59 produces a continuous uninterrupted process of taking 100 feet of film within the same sized cartridge as presently used with the 50 foot reels.

While it has been illustrated and described in the preferred embodiments of the invention, it is to be understood that it should not be limited to the precise constructions herein disclosed and that various changes and modifications may be made within the scope of the invention as defined in the appended claims.

What is claimed is:

1. A cartridge apparatus for motion picture and recording systems comprising an oval-shaped cartridge housing a supply tape reel core for supporting a supply of tape, opposing elongated slots in the sides of said housing and extending parallel to the major axis thereof, said core having axially extending projections extending into said slots to guide the movement of the supply reel core while permitting rotation thereof, a take-up tape reel core superimposed and in coplanar nested relationship with said supply tape core supported in said oval-shaped cartridge housing for receiving the tape from said supply reel core, said take-up reel being guided for movement along the major axis of the cartridge housing by the elongated sides thereof, said housing having an aperture in one side thereof to permit access to the tape carried by the reels for driving the same and a tape guide assembly fixed between the sides of the housing adjacent said aperture in the elongated axis thereof, for directing the tape from said supply reel core to said take-up reel in the process of the tape being driven therebetween, said supply and take-up reels both being laterally movable within said housing along the major axis thereof as the tape is transferred from the supply reel core to the take-up reel.

2. A cartridge apparatus for motion picture and recording systems as defined in claim 1 and said guide assembly including a block with an aperture therein permitting exposure to the tape and a back-up shield cooperating with said block for guiding the tape thereover, a prism disposed within the block opening to direct rays of light towards said tape and back-up shield, the opening in said block being aligned with the aperture in said housing.

3. A cartridge apparatus for motion picture and recording systems as defined in claim 1, a closure plate and spring-biased guide means for normally retaining said closure plate over the aperture in the side of the cartridge housing.

4. A cartridge apparatus for motion picture and recording systems as defined in claim 2 and said back-up shield having an angle cut confronting the apertures, said prism having a slot in the top thereof opposing the angle cut of the back-up shield, said angle cut and slot in the prism permitting the engagement of a drive mechanism with sprocket engaging perforations extending along the tape edge.

5. A cartridge apparatus for motion picture and recording systems as defined in claim 1 and said tape guide assembly including two blocks with the tape passing between them, one of said blocks being supplied with a spring extending over the supply tape to keep the tape from springing and to press it against the take-up reel.

6. A cartridge apparatus for motion picture and recording systems as defined in claim 1 wherein said tape is a motion picture film, the said supply reel core having tapered circumferential edges for catching and supporting said coil supply of film tape and wherein said supply reel is a hollow cylinder including a supporting disc, said cover including a slot in which said hollow cylinder moves laterally therein, a plate for providing sliding motion for said hollow cylinder, a friction plate against which said supply reel is moved, spring means operably pressing said supply reel against said friction plate, said reels being eccentrically disposed in relation to each other so that the supply reel operably helps said take-up reel to turn in one side faster than the other and thereby operably permitting continuous movement of said film tape within said cartridge housing.

7. A cartridge apparatus for motion picture and recording systems as defined in claim 6 wherein said guide assembly includes sprocket means for driving said film within said reels, coil supply rollers supporting said film, control rollers operably guiding said supply rollers, apertured means for exposure of said film and laterally-spaced slots permitting access for adjustment of the coil of film tape whenever it is necessary.

8. A cartridge apparatus for motion picture and recording systems as defined in claim 6, wherein said take-up reel includes a cylinder with tapered edges for catching said tape in its beginning of transfer operation between said supply reel core and said take-up reel.

9. A cartridge apparatus for motion picture and recording systems as defined in claim 6, wherein said cover includes an enclosure having a slot with numerical marks along its edges and indicator means moving the supply reel means along the numeral marks on said slot to indicate the amount of film tape on said take-up reel.

References Cited

UNITED STATES PATENTS

| | | | |
|---|---|---|---|
| 1,522,395 | 1/1925 | Thomas | 352—138 |
| 2,464,965 | 3/1949 | Chemel. | |
| 2,475,898 | 7/1949 | Jacobsen | 352—78 X |
| 2,975,990 | 3/1961 | Rodriguez. | |
| 3,121,863 | 2/1964 | Lovell | 242—55 X |
| 3,300,270 | 1/1967 | Finnerty | 352—78 X |
| 3,410,498 | 11/1968 | Winkler | 352—78 X |

NORTON ANSHER, Primary Examiner

M. H. HAYES, Assistant Examiner

U.S. Cl. X.R.

352—29, 156